(12) United States Patent
Jung et al.

(10) Patent No.: US 12,197,254 B2
(45) Date of Patent: Jan. 14, 2025

(54) WINDOW GLASS AND ELECTRONIC DEVICE INCLUDING THE SAME

(71) Applicant: SAMSUNG ELECTRONICS CO., LTD., Suwon-si (KR)

(72) Inventors: Seungjae Jung, Suwon-si (KR); Jeongeun Kim, Suwon-si (KR); Sanghoon Han, Suwon-si (KR); Byungsun Kim, Suwon-si (KR); Dongjun Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/414,713

(22) Filed: Jan. 17, 2024

(65) Prior Publication Data

US 2024/0152185 A1    May 9, 2024

Related U.S. Application Data

(63) Continuation of application No. 18/110,564, filed on Feb. 16, 2023, now Pat. No. 11,880,244, which is a
(Continued)

(30) Foreign Application Priority Data

Aug. 10, 2021   (KR) ................ 10-2021-0105129

(51) Int. Cl.
*G06F 1/16* (2006.01)

(52) U.S. Cl.
CPC .......... *G06F 1/1652* (2013.01); *G06F 1/1626* (2013.01)

(58) Field of Classification Search
None
See application file for complete search history.

(56) References Cited

U.S. PATENT DOCUMENTS 9,025,115 B2   5/2015   Harayama et al.
10,736,226 B2   8/2020   Han et al.
(Continued)

FOREIGN PATENT DOCUMENTS

CN   106774650 A   5/2017
JP   2018-60081 A   4/2018
(Continued)

OTHER PUBLICATIONS

International Search Report (PCT/ISA/210) dated Nov. 2, 2022 issued by the International Searching Authority in International Application No. PCT/KR2022/010912.
(Continued)

*Primary Examiner* — Stephen T. Reed
(74) *Attorney, Agent, or Firm* — Sughrue Mion, PLLC

(57) ABSTRACT

An electronic device includes a display, a housing, a glass panel provided on the display, and a shielding printed layer provided on a second surface of the glass panel in a region corresponding to a space between a side face of the electronic device and an edge of the display. The glass panel includes a flat portion and a curved portion, which includes a first region having a curvature of the curved portion, a second region perpendicular to the first region and covered by the shielding printed layer, and a chamfer region constructed between the first region and the second region. A ratio of a height of the chamfer region with respect to the first region and a length of the chamfer region with respect to the second region has a value in a range of 2 to 4.

20 Claims, 12 Drawing Sheets

Related U.S. Application Data continuation of application No. PCT/KR2022/010912, filed on Jul. 25, 2022.

(56) References Cited

U.S. PATENT DOCUMENTS

| | | |
|---|---|---|
| 10,819,381 B2 | 10/2020 | Lee et al. |
| 2017/0276977 A1 | 9/2017 | Li et al. |
| 2020/0014415 A1 | 1/2020 | Lee et al. |
| 2021/0055594 A1* | 2/2021 | Zheng ............... G02F 1/13452 |
| 2021/0168230 A1* | 6/2021 | Baker ................ G06F 1/1698 |
| 2022/0037601 A1 | 2/2022 | Lee et al. |
| 2022/0110219 A1 | 4/2022 | Moon |

FOREIGN PATENT DOCUMENTS

| | | |
|---|---|---|
| KR | 10-1547638 B1 | 8/2015 |
| KR | 10-2017-0033556 A | 3/2017 |
| KR | 10-2017-0045318 A | 4/2017 |
| KR | 10-2018-0055734 A | 5/2018 |
| KR | 10-2018-0113219 A | 10/2018 |
| KR | 10-1949745 B1 | 2/2019 |
| KR | 10-2020-0005834 A | 1/2020 |
| WO | 2021/010513 A1 | 1/2021 |

OTHER PUBLICATIONS

Written Opinion (PCT/ISA/237) dated Nov. 2, 2022 issued by the International Searching Authority in International Application No. PCT/KR2022/010912.

Extended European Search Report dated Sep. 13, 2024, issued by European Patent Office in European Patent Application No. 22856062.9.

* cited by examiner

WINDOW GLASS AND ELECTRONIC DEVICE INCLUDING THE SAME

CROSS-REFERENCE TO RELATED APPLICATION

This application is continuation of U.S. application Ser. No. 18/110,564, filed on Feb. 16, 2023, which is a bypass continuation of International Application No. PCT/KR2022/010912 designating the United States, filed on Jul. 25, 2022, in the Korean Intellectual Property Receiving Office and claims priority from Korean Patent Application No. KR 10-2021-0105129, filed on Aug. 10, 2021, the disclosures of which are incorporated by reference herein in their entireties.

BACKGROUND

1. Field

The disclosure relates to a window glass and an electronic device including the window glass.

2. Description of the Related Art

An electronic device, such as a smart phone, a tablet Personal Computer (PC), or the like may include a display for displaying an image. With the technical advancement, the electronic device may include various types of displays. For example, the electronic device may include a display (e.g., a flexible display) having a curved shape at least in part. In order to protect the display having the curved shape, glass having a shape of a curve to which the same curvature is applied may be disposed to the display of the electronic device.

The electronic device including the glass having the curved shape may include glass with a processed edge to protect a side of the display. The electronic device including the glass having the curved shape may further include a shielding printed layer to reduce light emission to a region other than a display region.

The light emitted from the display may be totally reflected at an interface between the glass and the air. The light totally reflected to the inside of the glass at the interface may be emitted to the outside of the electronic device while passing through an edge of the glass. As the light is emitted to the outside, the light may be transmitted in a region other than the display.

In addition, it may be difficult that the printed layer of the electronic device is constructed at the edge of the glass. For example, since the edge of the glass is small in size, ink may be clogged in the process of constructing the printed layer. In addition, the printed layer may not be uniformly constructed at the edge of the glass. Accordingly, a light leakage phenomenon in which light is non-uniformly leaked through the edge of the glass may be observed.

Various example embodiments provided in the disclosure may provide an electronic device which blocks the light from being emitted to the region other than the display by changing a processing size of the edge of the glass.

SUMMARY

According to an aspect of the disclosure, there is provided an electronic device including: a display, a housing comprising at least part of a side face of the electronic device and a rear face of the electronic device, a glass panel provided on the display and configured to cover a front face of the electronic device, wherein the glass panel includes a first surface facing external to the electronic device and a second surface different from the first surface; and a shielding printed layer provided on the second surface of the glass panel in a region corresponding to a space between the side face of the electronic device and an edge of the display, wherein the glass panel includes a flat portion and a curved portion which is bent from the flat portion towards the side face of the electronic device, wherein on the curved portion of the glass panel, one end adjacent to the side face includes a first region having a curvature of the curved portion, a second region perpendicular to the first region and covered by the shielding printed layer, and a chamfer region constructed between the first region and the second region, and wherein a ratio of a height of the chamfer region with respect to the first region and a length of the chamfer region with respect to the second region has a value in a range of 2 to 4.

According to another aspect of the disclosure, there is provided an electronic device including: a display, a housing comprising at least part of a side face of the electronic device and a rear face of the electronic device, a glass panel provided on the display and configured to cover a front face of the electronic device, wherein the glass panel includes a first surface facing external to the electronic device and a second surface different from the first surface and a shielding printed layer provided on the second surface of the glass panel in a region corresponding to a space between the side face of the electronic device and an edge of the display, wherein the glass panel includes a flat portion and a curved portion which is bent from the flat portion towards the side face of the electronic device, wherein the curved portion includes: a first region having a curvature of the curved portion; a chamfer region extending from an edge of the first region toward a side face of the housing with a specific inclination; and a second region extending in a direction perpendicular to the first region and constituting a side face of the glass panel from one end of the chamfer region, wherein a virtual axis extending in a first direction parallel to the second region is defined as a first axis from a first corner where the second region and the chamfer region meet, wherein a virtual axis facing a second direction perpendicular to the first direction on the first axis and extending to a second corner where the first region and the chamfer region meet is defined as a second axis, wherein a virtual corner where the first axis and the second axis meet is defined as a third corner, and wherein a ratio of a first distance between the first corner and third corner of the chamfer region and a second distance between the second corner and third corner of the chamfer region has a value in the range of 2 to 4.

According to various example embodiments of the disclosure, there is provided an electronic device in which light is totally reflected at an interface of glass by varying an incident angle of light emitted from the inside of the glass. Accordingly, light emitted from a region other than a display to the outside of the electronic device may be reduced.

In addition, according to various example embodiments, since light emitted from the region other than the display to the outside is reduced without having to add a printed layer, the electronic device may provide glass capable of reducing processing cost and time.

In addition thereto, various effects which are directly or indirectly understood through the disclosure may be provided.

BRIEF DESCRIPTION OF THE DRAWINGS

With regard to the description of the drawings, similar reference numerals may be used to refer to similar or related elements.

DETAILED DESCRIPTION

Hereinafter, various example embodiments of the disclosure are described with reference to the accompanying drawings. However, it should be appreciated that this is not intended to limit the technological features set forth herein to particular embodiments and include various modifications, equivalents, and/or alternatives for an example embodiment of the disclosure.

Figure 1:
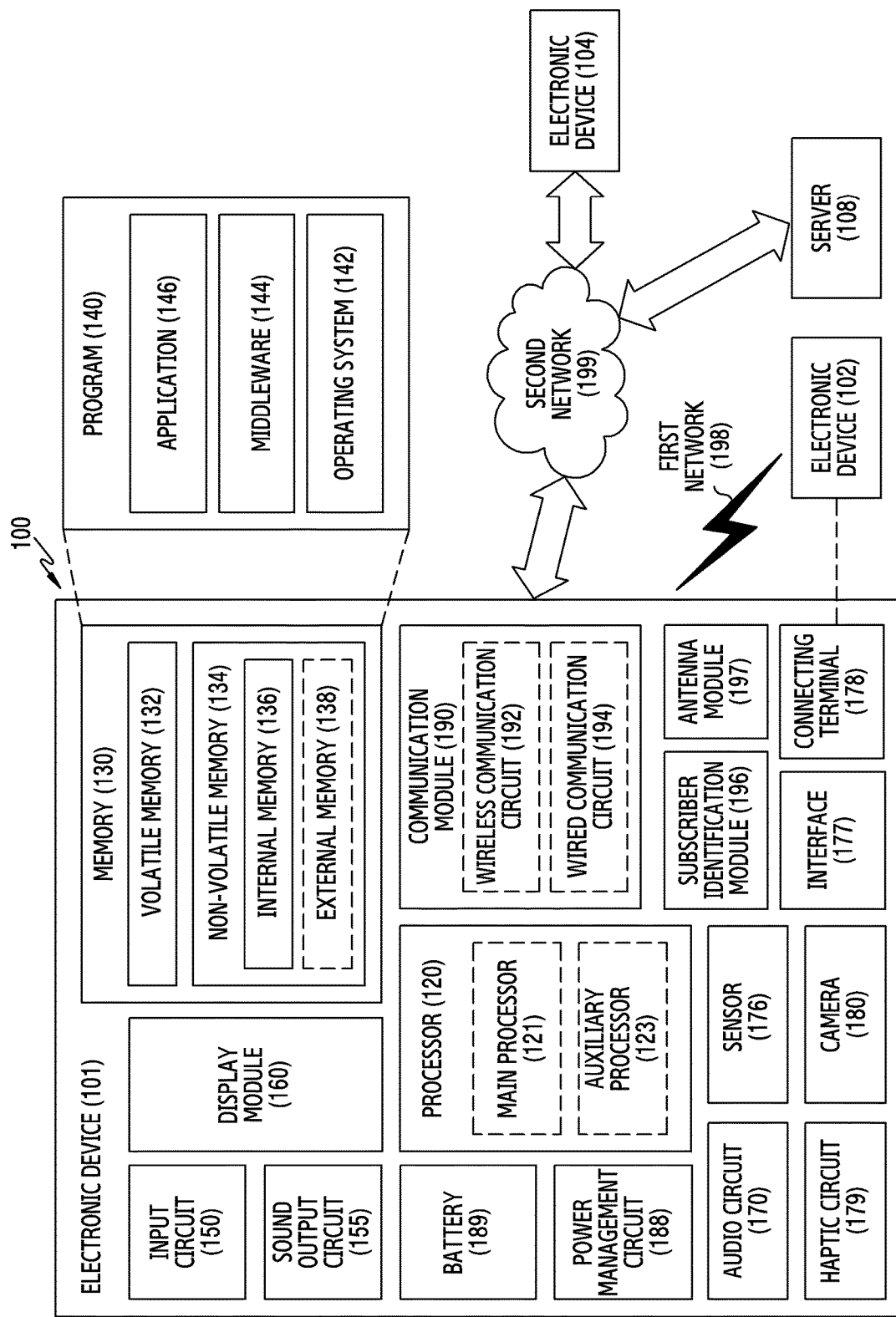
FIG. 1 is a block diagram of an electronic device in a network environment according to various example embodiments.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, memory 130, an input circuit 150, a sound output circuit 155, a display module 160, an audio circuit 170, a sensor 176, an interface 177, a connecting terminal 178, a haptic circuit 179, a camera 180, a power management circuit 188, a battery 189, a communication circuit 190, a subscriber identification module (SIM) 196, or an antenna 197. In some embodiments, at least one of the components (e.g., the connecting terminal 178) may be omitted from the electronic device 101, or one or more other components may be added in the electronic device 101. In some embodiments, some of the components (e.g., the sensor 176, the camera 180, or the antenna 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor 176 or the communication circuit 190) in volatile memory 132, process the command or the data stored in the volatile memory 132, and store resulting data in non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor 176, or the communication circuit 190) among the components of the electronic device 101, instead of the main processor 121 while the main processor 121 is in an inactive (e.g., sleep) state, or together with the main processor 121 while the main processor 121 is in an active state (e.g., executing an application). According to an example embodiment, the auxiliary processor 123 (e.g., an image signal processor or a communication processor) may be implemented as part of another component (e.g., the camera 180 or the communication circuit 190) functionally related to the auxiliary processor 123. According to an example embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input circuit 150 may receive a command or data to be used by another component (e.g., the processor 120) of the electronic device 101, from the outside (e.g., a user) of the electronic device 101. The input circuit 150 may include, for example, a microphone, a mouse, a keyboard, a key (e.g., a button), or a digital pen (e.g., a stylus pen).

The sound output circuit 155 may output sound signals to the outside of the electronic device 101. The sound output circuit 155 may include, for example, a speaker or a receiver. The speaker may be used for general purposes, such as playing multimedia or playing record. The receiver may be used for receiving incoming calls. According to an example embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an example embodiment, the display module 160 may include a touch sensor adapted to detect a touch, or a pressure sensor adapted to measure the intensity of force incurred by the touch.

The audio circuit 170 may convert a sound into an electrical signal and vice versa. According to an example embodiment, the audio circuit 170 may obtain the sound via the input circuit 150, or output the sound via the sound output circuit 155 or a headphone of an external electronic device (e.g., an electronic device 102) directly (e.g., wiredly) or wirelessly coupled with the electronic device 101.

The sensor 176 may detect an operational state (e.g., power or temperature) of the electronic device 101 or an environmental state (e.g., a state of a user) external to the electronic device 101, and then generate an electrical signal or data value corresponding to the detected state. According to an example embodiment, the sensor 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an example embodiment, the connecting terminal 178 may include, for example, a HDMI connector, a USB connector, a SD card connector, or an audio connector (e.g., a headphone connector).

The haptic circuit 179 may convert an electrical signal into a mechanical stimulus (e.g., a vibration or a movement) or electrical stimulus which may be recognized by a user via his tactile sensation or kinesthetic sensation. According to an example embodiment, the haptic circuit 179 may include, for example, a motor, a piezoelectric element, or an electric stimulator.

The camera 180 may capture a still image or moving images. According to an example embodiment, the camera 180 may include one or more lenses, image sensors, image signal processors, or flashes.

The power management circuit 188 may manage power supplied to the electronic device 101. According to one embodiment, the power management circuit 188 may be implemented as at least part of, for example, a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication circuit 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication circuit 190 may include one or more communication processors that are operable independently from the processor 120 (e.g., the application processor (AP)) and supports a direct (e.g., wired) communication or a wireless communication. According to an example embodiment, the communication circuit 190 may include a wireless communication circuit 192 (e.g., a cellular communication circuit, a short-range wireless communication circuit, or a global navigation satellite system (GNSS) communication circuit) or a wired communication circuit 194 (e.g., a local area network (LAN) communication circuit or a power line communication (PLC) module). A corresponding one of these communication circuits may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication circuits may be implemented as a single component (e.g., a single chip), or may be implemented as multi components (e.g., multi chips) separate from each other. The wireless communication circuit 192 may identify and authenticate the electronic device 101 in a communication network, such as the first network 198 or the second network 199, using subscriber information (e.g., international mobile subscriber identity (IMSI)) stored in the subscriber identification module 196.

The wireless communication circuit 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication circuit 192 may support a high-frequency band (e.g., the mmWave band) to achieve, e.g., a high data transmission rate. The wireless communication circuit 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication circuit 192 may support various requirements specified in the electronic device 101, an external electronic device (e.g., the electronic device 104), or a network system (e.g., the second network 199). According to an example embodiment, the wireless communication circuit 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna 197 may transmit or receive a signal or power to or from the outside (e.g., the external electronic device) of the electronic device 101. According to an example embodiment, the antenna 197 may include an antenna including a radiating element composed of a conductive material or a conductive pattern formed in or on a substrate (e.g., a printed circuit board (PCB)). According to an example embodiment, the antenna 197 may include a plurality of antennas (e.g., array antennas). In such a case, at least one antenna appropriate for a communication scheme used in the communication network, such as the first network 198 or the second network 199, may be selected, for example, by the communication circuit 190 (e.g., the wireless communication circuit 192) from the plurality of antennas. The signal or the power may then be transmitted or received between the communication circuit 190 and the external electronic device via the selected at least one antenna. According to an example embodiment, another component (e.g., a radio frequency integrated circuit (RFIC)) other than the radiating element may be additionally formed as part of the antenna 197.

According to various example embodiments, the antenna 197 may form a mmWave antenna. According to an example embodiment, the mmWave antenna may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an example embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2A:
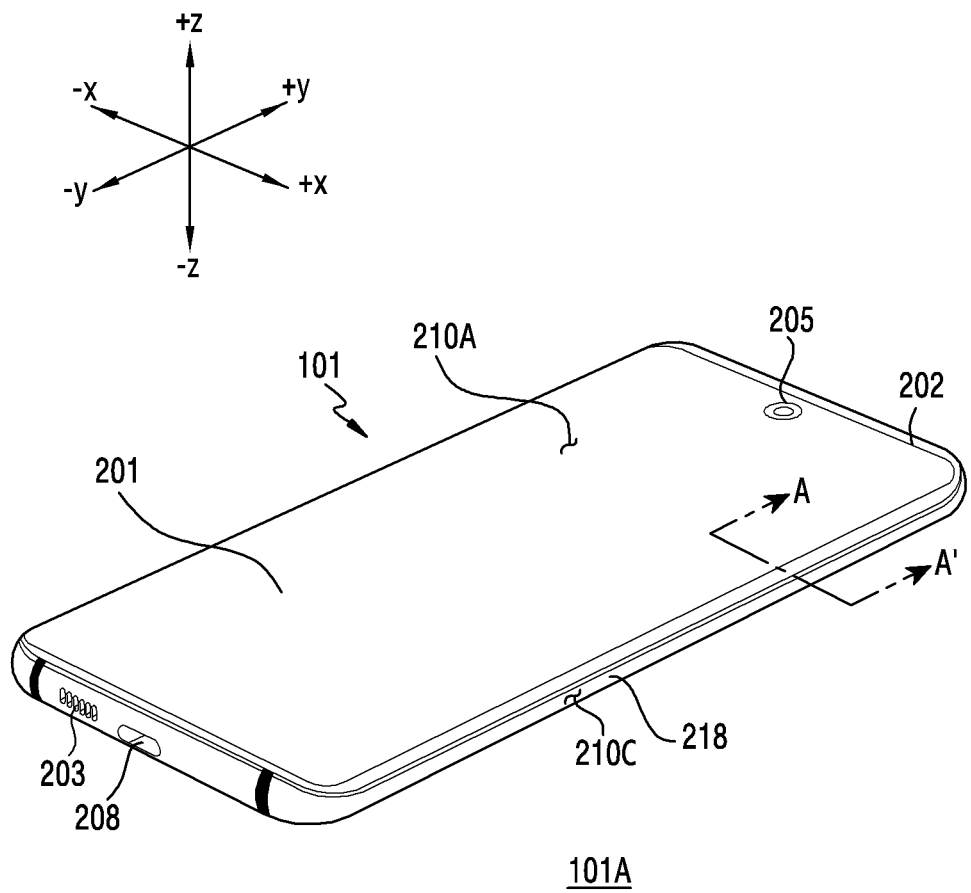
FIG. 2A is a perspective view illustrating a front face of an electronic device according to an example embodiment.
Figure 2B:
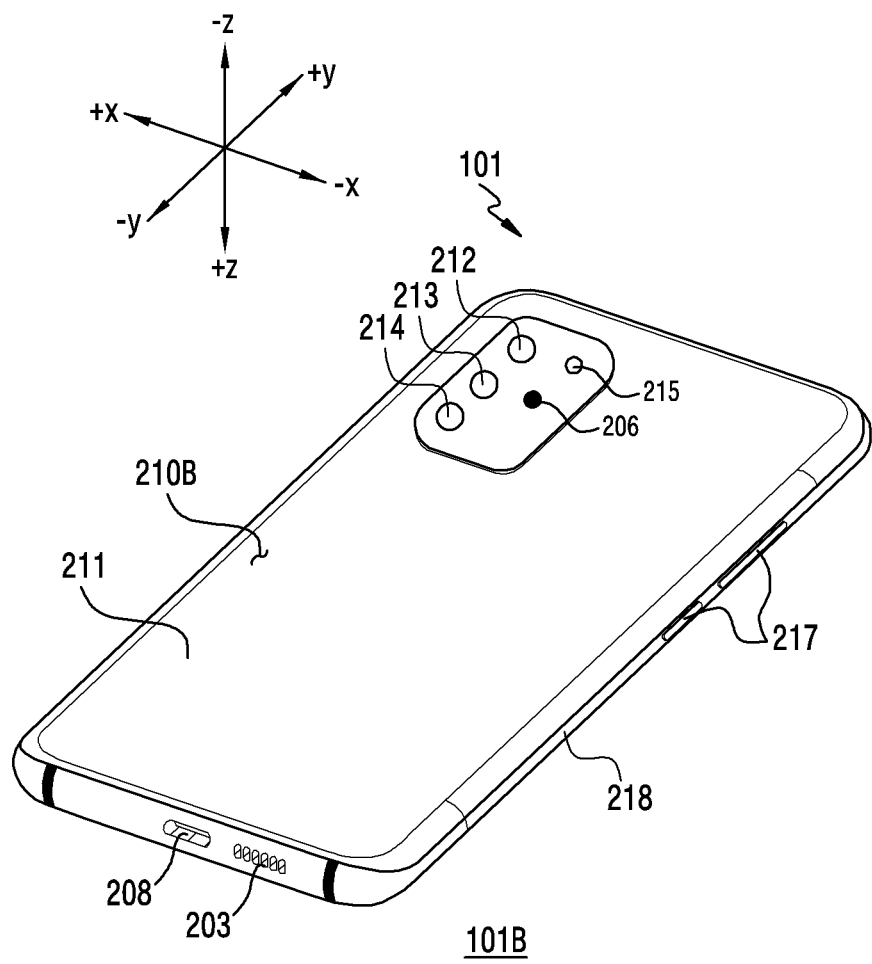
FIG. 2B is a perspective view illustrating a rear face of an electronic device according to an example embodiment.

FIG. 2A is a perspective view illustrating a front face 101A of an electronic device 101 and FIG. 2B is a perspective view illustrating a rear face 101B of the electronic device 101 according to an example embodiment.

Referring to FIGS. 2A and 2B, the electronic device 101 (e.g., the electronic device 101 of FIG. 1) according to an example embodiment may include a housing 210 including a first face (or a "front face") 210A, a second face (or a "rear face") 210B, and a side surface 210C (or a "sidewall") surrounding a space between the first face 210A and the second face 210B. In another example embodiment, the housing 210 may refer to a structure which constitutes part of the first face 210A, second face 210B, and side face 210C of FIGS. 2A and 2B.

According to an example embodiment, the first face 210A may be constructed of a front plate 202 (e.g., a polymer plate or a glass plate including various coating layers) which is at least partially transparent. According to an example embodiment, the front plate 202 may include a curved portion seamlessly extending by being bent from the first face 210A toward a rear plate 211 in at least one side edge portion.

According to various example embodiments, the second face 210B may be constructed of the rear plate 211. According to an example embodiment, the rear plate 211 may be opaque, however the disclosure is not limited thereto. The rear plate 211 may be constructed of, for example, coated or colored glass, ceramic, polymer, metallic materials (e.g., aluminum, stainless steel (STS), or magnesium) or a combination of at least two of the materials. According to an example embodiment, the rear plate 211 may include a curved portion seamlessly extending by being bent from the second face 210B toward the front plate 202 in at least one side edge portion.

According to various example embodiments, the side face 210C may be constructed of a side member (or a "bracket") 218 joined to the front plate 202 and the rear plate 211 and including metal and/or polymer. In some example embodiments, the rear plate 211 and the side member 218 may be constructed integrally and may include the same material (e.g., a metallic material such as aluminum).

According to an example embodiment, the electronic device 101 may include at least one of a display 201, an audio region 203, a sensor, cameras 205, 212, 213, 214 and 216, a flash 206, a key input device 217 (i.e., button), and a connector hole 208.

In some example, the electronic device 101 may omit at least one of components (e.g., the key input device 217), or other components may be additionally included. For example, the electronic device 101 may include a sensor. For example, the sensor may be provided on a rear surface of a screen display region of the display 201, and is visible from outside the electronic device 101 through the front plate 202. For example, although at least one of an optical sensor, an ultrasonic sensor, and a capacitive sensor may be provided on the rear surface of the screen display region of the display 201, the disclosure is not limited thereto. In some example embodiments, the electronic device 101 may further include a light emitting element, and the light emitting element may be disposed at a location adjacent to the display 201 in the region provided by the front plate 202.

The light emitting element may provide, for example, state information of the electronic device 101 in an optical form. In another example embodiment, the light emitting element may provide, for example, a light source interworking with an operation of the camera 205. The light emitting element may include, for example, an LED, an IR LED, and/or a xenon lamp.

The display 201 may be visible from outside the electronic device 101 through, for example, some portions of the front plate 202. In an example embodiment, an edge of the display 201 may be constructed to be substantially the same as a shape of a periphery (e.g., a curved face) adjacent to the front plate 202.

In another example embodiment, the electronic device 101 may have a recess, notch, or opening constructed on a portion of a screen display region of the display 201, and may include other electronic components, for example, the camera 205 or a sensor, which are aligned with the recess, the notch, or the opening. In another example embodiment, at least one of the cameras 212, 213, 214, and 215, a fingerprint sensor, and a flash (e.g., 206) may be included in a rear face of the screen display region of the display 201. In another example embodiment, the display 201 may be disposed adjacent to or joined with a touch sensing circuit, a pressure sensor capable of measuring touch strength (pressure), and/or a digitizer for detecting a magnetic-type stylus pen.

The display 201 may be constructed as an integrated display. However, a shape of the display is not limited thereto. For example, the display 201 may be constructed as a foldable display.

The audio circuit region 203 may include a microphone hole and a speaker hole. The microphone hole may have a microphone provided inside thereof to acquire external sound and the speaker hole may have a speaker provided inside thereof to output sound. In some example embodiments, a plurality of microphones may be provided inside the microphone hole to sense a sound direction. In some example embodiments, the speaker hole and the microphone hole may be implemented as a single hole, or the speaker (e.g., a piezo speaker) may be included without the speaker hole. The speaker hole may include an external speaker hole and a communication receiver hole.

The electronic device 101 includes a sensor to generate an electrical signal or data value corresponding to an internal operational state or an external environmental state. The sensor may further include a proximity sensor disposed to the first face 210A of the housing 210, a fingerprint sensor disposed to the rear face of the display 201, and/or a biometric sensor (e.g., a Heart Rate Monitoring (HRM) sensor) disposed to the second face 210B of the housing 210. The electronic device 101 may further include at least one of senor modules, for example, a gesture sensor, a gyro sensor, an atmospheric pressure sensor, a magnetic sensor, an acceleration sensor, a grip sensor, a color sensor, an InfraRed (IR) sensor, a biometric sensor, a temperature sensor, a humidity sensor, and an illuminance sensor.

The cameras 205, 212, 213, 214, 215, and 206 may include a first camera 205 provided on the first face 210A of the electronic device 101, second cameras 212, 213, 214, and 215 provided on the second face 210B. Moreover, a flash 206 may be provided on the second face 210B. The cameras 205, 212, 213, 214, and 215 may include one or more lenses, an image sensor, and/or an image signal processor. The flash 206 may include, for example, a Light Emitting Diode (LED) or a xenon lamp. In some example embodiments, two or more lenses (an infrared camera, wide-angle and telephoto lenses) and image sensors may be provide on one face of the electronic device 101.

The key input device 217 may be provided to the side face 210C of the housing 210. In another example embodiment, the electronic device 101 may not include the entirety or part of the aforementioned key input device 217. The key input device 217, which is not included, may be implemented on the display 201 in a different form such as a soft key or the like. In some embodiments, the key input device may include at least part of the fingerprint sensor disposed to the second face 210B of the housing 210.

The connector hole 208 may accommodate a connector for transmitting/receiving power and/or data of an external electronic device and/or a connector for transmitting/receiving an audio signal with respect to the external electronic device. For example, the connector hole 208 may include a USB connector or an earphone jack. According to an example embodiment, the USB connector and the earphone jack may be implemented as a single hole (e.g., 208 in FIGS. 2A and 2B). According to another example embodiment, the electronic device 101 may transmit and receive power and/or data with respect to external electronic devices (e.g., the electronic devices 102 and 104 of FIG. 1) without an additional connector hole, and may transmit and receive an audio signal.

Figure 3:
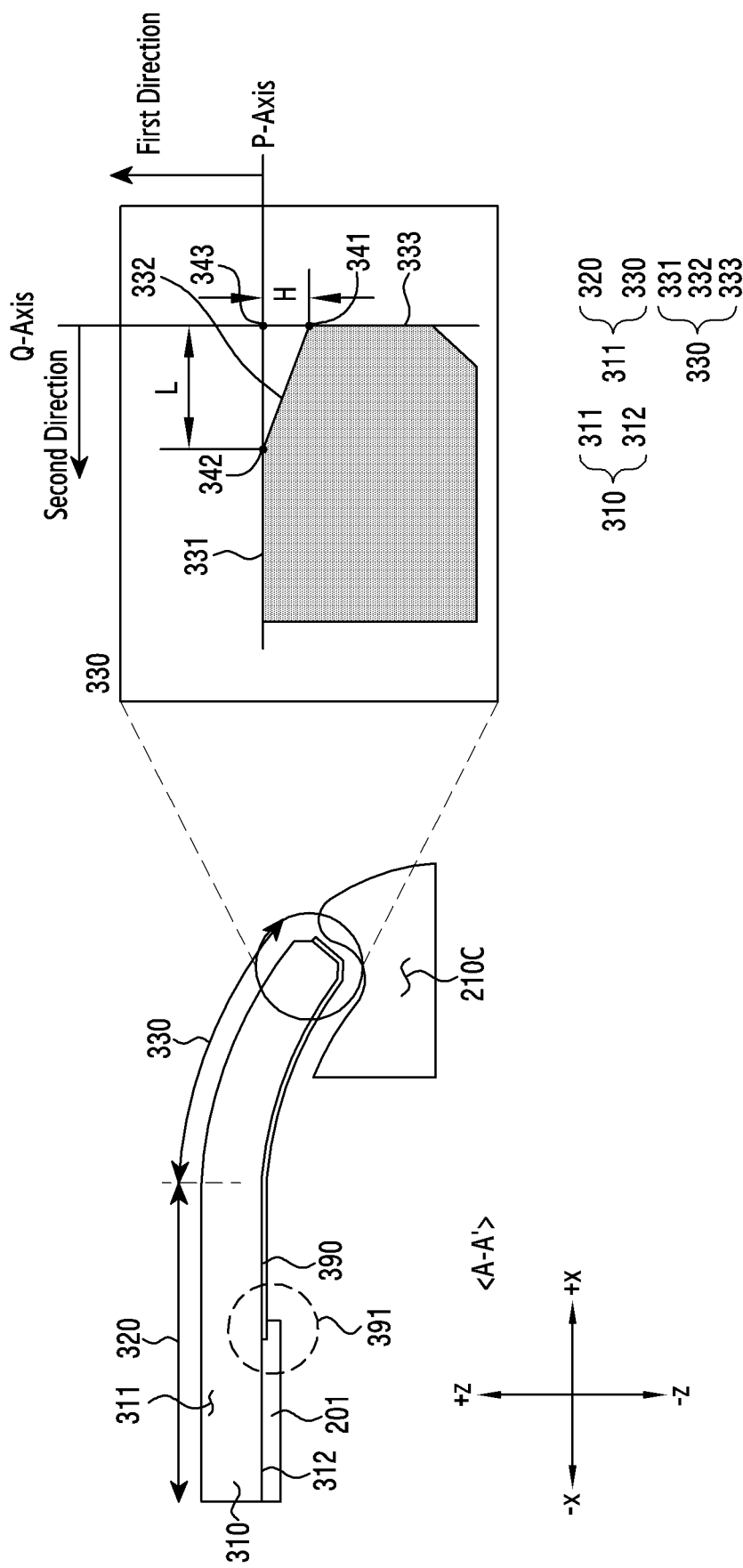
FIG. 3 is a cross-sectional view of the electronic device of FIG. 2A, taken along a direction A-A', according to an example embodiment.

FIG. 3 is a cross-sectional view of the electronic device 101 of FIG. 2A, taken along a direction A-A', according to an example embodiment. According to an example embodiment, FIG. 3 illustrates a deployment relationship among the display 201, glass 310, and the housing 210 of the electronic device 101.

According to an example embodiment, the electronic device 101 may include the display 201, the housing 210, the glass 310, and a shielding printed layer 390. According to an example embodiment, the glass 310 may be a glass panel, a glass layer or a glass sheet.

According to an example embodiment, the glass 310 may constitute a front face of the electronic device 101. For example, the glass 310 may be provided in a first direction (e.g., +z direction) facing the front face (e.g., 210A of FIG. 2A). According to another example embodiment, the glass 310 may be stacked on the display 210 provided on the front face 210A of the electronic device 101 with respect to the first direction.

According to an example embodiment, at least part of the glass 310 may be exposed to the outside of the electronic device 101. In addition, the remaining portion other than the at least part of the glass 310 may face the inside of the electronic device 101. For example, the glass 310 may include a first surface 311 facing the outside of the electronic device 101 and a second surface 312 other than the first surface.

According to an example embodiment, the second surface 312 may correspond to a surface facing the inside of the electronic device 101. For example, at least part of the second face 312 may be constructed in a second direction (e.g., −z direction) opposite to the first direction of the electronic device. According to another example embodiment, part of the second face 312 may be constructed to face the side face 210C of the housing 210 of the electronic device 101.

According to an example embodiment, the glass 310 may be constructed of a transparent material. However, the material of the glass 310 is not limited thereto. For example, at least some regions of the glass 310 may be constructed of a transparent material, and the other regions may be constructed of an opaque material.

According to an example embodiment, the display 201 may be provided on at least part of the second face 312 of the glass 310. According to an example embodiment, since the display 201 is provided on the second face 312, the display 201 may be visible from outside the electronic device 101 through the glass 310. Accordingly, the display 201 may provide a visual image to the outside.

According to an example embodiment, the shielding printed layer 390 may be provided on the second surface 312 of the glass 310.

According to an example embodiment, the shielding printed layer 390 may be provided in a region corresponding to a space between an edge 391 of the display 201 and the side face 210C of the housing 210 of FIG. 2A of the electronic device 101, on the second face 312 of the glass 310.

According to an example embodiment, the shielding printed layer 390 may be provided on at least part of the second face 312. According to an example embodiment, the shielding printed layer 390 may be provided on a region adjacent to the edge 391 of the display 201, on the second face 312 of the glass 310.

For example, the shielding printed layer 390 may be provided to overlap in part with the display 201. According to another example embodiment, when the glass 310 is viewed from the first direction (e.g., +z direction), the edge 391 of the display 201 may overlap at least in part with the shielding printed layer 390.

Accordingly, since the shielding printed layer 390 and the edge 391 of the display 201 overlap, the edge 391 of the display 201 may be covered by the shielding printed layer 390. According to an example embodiment, since the edge 391 of the display 201 is covered, the edge 391 of the display 201 may not be exposed to the outside. According to an example embodiment, since the edge 391 is not exposed to the outside, the electronic device 101 may provide the display 201 having improved visibility.

According to an example embodiment, the shielding printed layer 390 may be constructed by extending from the second face 312 of the glass 310 corresponding to the edge 391 of the display 201 up to at least part of a curved portion 330 of the glass 310 described below.

According to an example embodiment, since the shielding printed layer 390 is constructed up to at least part of the curved portion 330 of the glass 310, light reflected from the inside of the glass 310 may be reflected to the side face 210C of the housing 210 of the electronic device 101, thereby reducing light emission to the outside. By blocking or reducing the light emitted to the outside, the electronic device 101 may increase convenience or usability of a user viewing the display 201.

However, the disclosure is not limited to the shielding printed layer 390 for blocking of the light emission. For example, part of the second face 312 of the glass 310 may be coated with a low-reflectance color (e.g., black) instead of the shielding printed layer 390. Since the low-reflectance color is coated on at least part of the second face 312, the electronic device 101 may block light emission.

According to an example embodiment, the housing 210 may be constructed of a metallic material. For example, the side face 210C of the housing 210 may be constructed of the metallic material. However, the material of the housing 210 is not limited thereto. For example, at least some regions of the housing 210 may be constructed of the metallic material, and the other regions may be constructed of a polymer material.

According to an example embodiment, the glass 310 may include a flat portion 320 and the curved portion 330. However, a shape of the glass 310 is not limited thereto. For example, the glass 310 may be constructed only with the flat portion 320. According to another example embodiment, the glass 310 may be constructed only with the curved portion 330. According to an example embodiment, the flat portion 320 and the curved portion 330 may be constructed on the first face 311 of the glass 310.

According to an example embodiment, the flat portion 320 and/or curved portion 330 of the glass 310 may be constructed in a direction facing the front face 210A of the electronic device 101. According to an example embodiment, at least part of the flat portion 320 and/or curved portion 330 may correspond to a region in which the display 201 is deployed. For example, the display 201 may overlap with at least part of the flat portion 320, when viewed in a direction facing the front face 210A of the electronic device 101.

According to an example embodiment, the flat portion 320 and/or the curved portion 330 and a region corresponding to the display 201 may mean a display region.

According to an example embodiment, the curved portion 330 may be constructed by extending from the flat portion 320 of the glass 310. For example, the curved portion 330 may be constructed by bending and extending from an edge of the flat portion 320 toward the side face 210C of the electronic device 101.

According to an example embodiment, the curved portion 330 of the glass 310 may include a first region 331, a second region 333, and a chamfer region 332.

According to an example embodiment, the first region 331, the chamfer region 332, and the second region 333 may be constructed at one end adjacent to the side face 210C of the housing 210, on the curved portion 330 of the glass 310.

According to an example embodiment, the first region 331 may extend from the edge of the flat portion 320, and may be constructed as a region having the same curvature as the curved portion 330.

According to an example embodiment, the second region 333 may be constructed in one region of the curved portion 330. According to an example embodiment, the second region 333 may be constructed on the second face of the glass 310 not exposed to the outside. According to an example embodiment, the second region 333 may be perpendicular to the first region 331, and may constitute the side face of the glass 310. According to an example embodiment, the second region 333 may be constructed in a direction facing the side face 210C of the housing 210.

According to an example embodiment, at least part of the second region 333 may be covered by the shielding printed layer 390. For example, the entirety of the second region 333 may be covered by the shielding printed layer 390.

According to an example embodiment, the chamfer region 332 may be constructed between the first region 331 and the second region 333. According to an example embodiment, the chamfer region 332 may be constructed as one cut-off face. According to another example embodiment, the chamfer region 332 may be constructed by extending from the first region 331 to the second region 333 with a specific inclination. For example, an interface of the chamfer region 332 may be inclined and extend from the first region 331 to the second region 333. However, the interface of the chamber region 332 is not limited thereto. For example, the chamfer region 332 may be constructed to be curved in part.

According to an example embodiment, a virtual axis extending from a first corner 341 where the second region 333 and the chamfer region 332 meet in a first direction parallel to the second region 333 may be defined as a first axis (Q-axis).

According to another example embodiment, a virtual axis facing a second direction perpendicular to the first direction on the first axis (Q-axis), and extending to a second corner 342 where the first region 331 and the chamfer region 332 meet may be defined as a second axis (P-axis). According to an example embodiment, a virtual corner where the first axis (Q-axis) and the second axis (P-axis) meet may be defined as a third corner 343.

According to an example embodiment, a distance on the first axis (Q-axis) from the first corner 341 where the second region 333 and the chamfer region 332 meet to the second corner 342 where the first region 331 and the chamfer region 332 meet may mean a height H of the chamfer region 332 with respect to the first region 331.

Therefore, a distance from the first corner 341 to the third corner 343 may mean the height H of the chamfer region 332.

According to an example embodiment, a distance on the second axis (P-axis) perpendicular to the first axis (Q-axis) from the first corner 341 to the second corner 342 may mean a length L of the chamfer region 332 with respect to the second region 333.

Therefore, a distance from the second corner 342 to the third corner 343 may mean the length L of the chamfer region 332.

According to an example embodiment, an inclination of the chamfer region 332 may be defined as a ratio of the height H of the chamfer region 332 and the length L of the chamfer region 332.

According to an example embodiment, the ratio of the height H and length L of the chamfer region 332 may have a value in the range of 2 to 4. According to an example embodiment, when the ratio of the height H and the length L has a value in the range of 2 to 4, light introduced from the display 201 to the glass 310 may be totally reflected inside the glass 310. According to an example embodiment, since the light is totally reflected, the electronic device 101 may effectively block the light from being emitted to the outside of the glass 310.

According to an example embodiment, since an amount of light emitted to the outside is reduced, the electronic device 101 may have an improved appearance. In addition, a user's experience of using the electronic device 101 may increase.

A path of light inside the glass 310 according to the ratio of the height L and length L of the chamfer region 332 will be described in detail with reference to FIG. 4 and FIG. 5.

Figure 4:
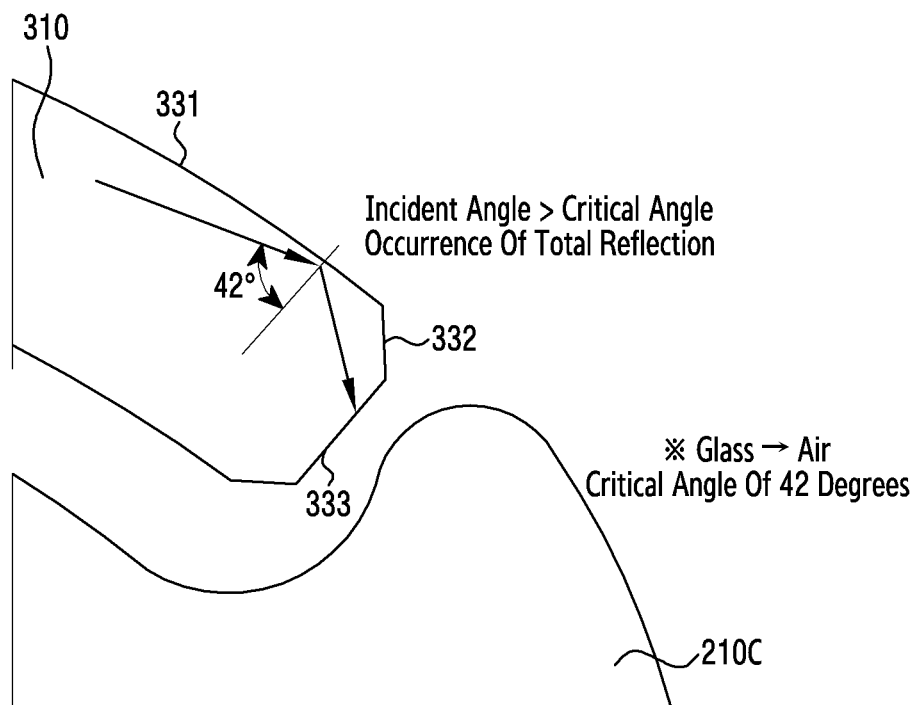
FIG. 4 illustrates a path of light emitted from the inside of glass, according to an example embodiment.

FIG. 4 illustrates a path of light introduced into the glass 310, according to an example embodiment.

Figure 5:
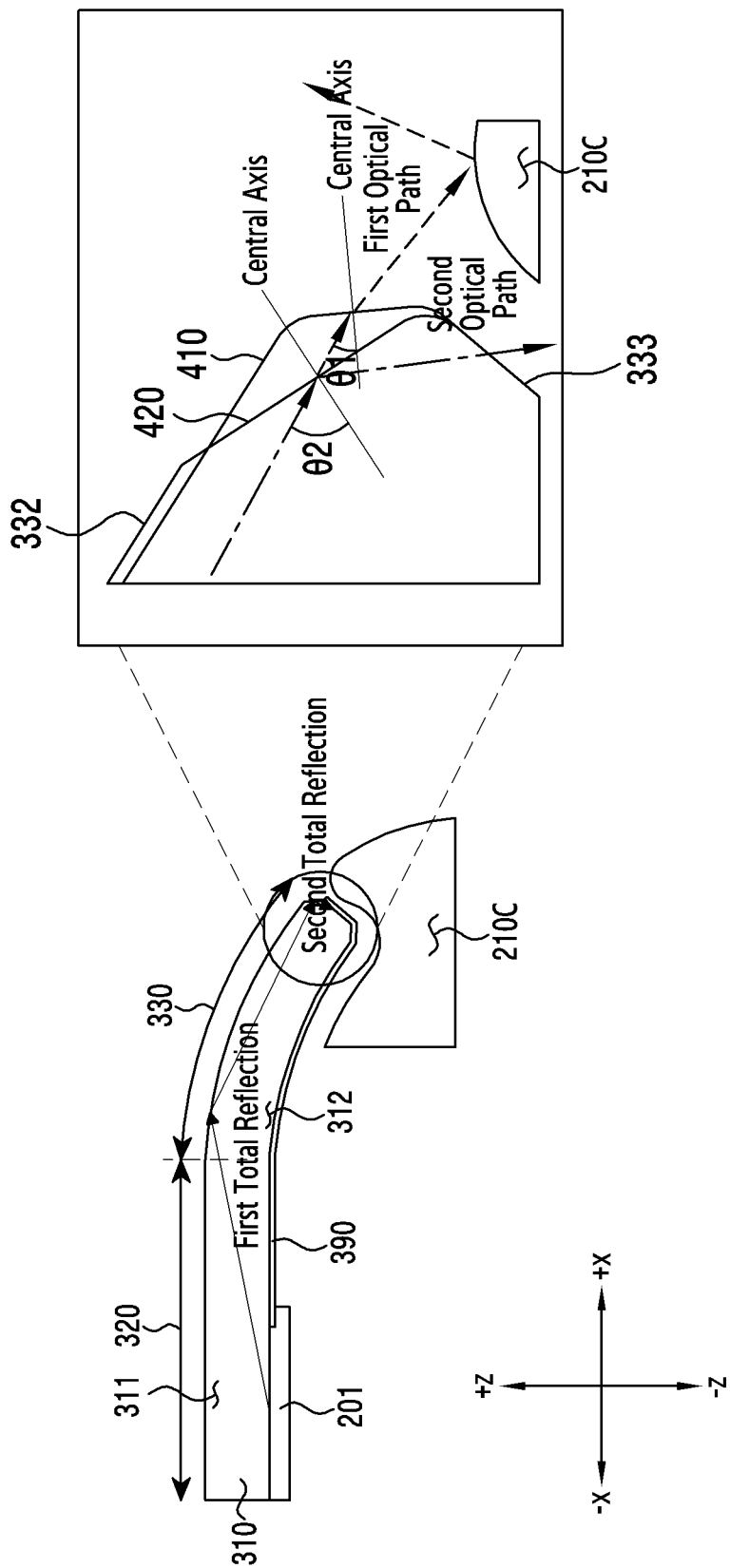
FIG. 5 is a cross-sectional view illustrating a path of light, based on a ratio of a height and length of a chamfer region on glass of an electronic device, according to an example embodiment.

FIG. 5 is a cross-sectional view illustrating a path of light, based on the ratio of the height H and length L of the chamfer region 332 on the glass 310 of the electronic device 101, according to an example embodiment.

According to an example embodiment, FIG. 4 illustrates a critical angle for total reflection of light emitted from the inside of the glass 310.

Snell's law states that a ratio of a sine value of an incidence angle and a sine value of a refraction angle is always constant when light passes between two media with different refractive indices. In addition, total reflection is a phenomenon in which when light travels from a material with a high refractive index (e.g., glass, water) to an interface of a material with a low refractive index (e.g., air), if an incidence angle is greater than a specific critical angle, the light does not pass through the interface and is reflected at the interface. The specific critical angle at which the total reflection is achieved may be determined according to the Snell's law.

According to an example embodiment, the glass (e.g., 310 of FIG. 3) of the electronic device 101 may have a refractive index of 1.5. According to the Snell's law, the critical angle between the glass 310 with a refractive index of 1.5 and the air with a refractive index of 1 is 42 degrees.

According to an example embodiment, light introduced into the glass 310 from the edge of the display 201 may have an incident angle of at least 42 degrees, and may be incident to the interface between the glass 310 and the air. When the incident angle of the light is at least 42 degrees, the light incident to the interface may not pass through the glass 310, and may be totally reflected at the interface.

However, the refractive index of the glass 310 of the electronic device 101 is not limited thereto. For example, the glass 310 has a refractive index of 1.5, and may be constructed to have a refractive index greater than at least 1, i.e., a refractive index of the air.

FIG. 5 illustrates a process in which light emitted from the display 201 is totally reflected at the interface between the glass 310 of the electronic device 101 and the air.

According to an example embodiment, the light emitted from the display 201 may be totally reflected first at the interface between the flat portion 320 of the glass 310 and the air. According to another example embodiment, the light emitted from the display 201 may be totally reflected first at the interface between the first region 331 of the curved portion 330 of the glass 310 and the air.

According to an example embodiment, the first totally reflected light may reach the chamfer region 332 of the curved portion 330 of the glass 310. According to an example embodiment, when an incident angle of the light reaching the chamfer region 332 is less than 42 degrees, the first totally reflected light may be transmitted to the outside by being refracted at the interface between the chamfer region 332 and the air.

According to another example embodiment, when the incident angle of the light reaching the chamfer 332 is greater than or equal to 42 degrees, the first totally reflected light may be totally reflected secondly at the interface between the chamfer region 332 and the air. According to an example embodiment, the secondly totally reflected light may reach the shielding printed layer 390 or may reach the side face 210C of the housing 210 of the electronic device 101.

According to an example embodiment, the incident angle of the light incident to the chamfer region 332 may vary depending on the ratio of the height H of the chamfer region 332 with respect to the first region 331 and the length L of the chamfer region 332 with respect to the second region.

According to an example embodiment, the inclination of the interface of the chamfer region 332 may vary depending on the ratio of the height H and length L of the chamfer region 332. According to an example embodiment, a change in the inclination of the interface may result in a change in an angle (e.g., θ1 or θ2) between a central axis perpendicular to the interface and the incident light.

According to an example embodiment, when the chamfer region 332 is constructed such that the ratio of the height H and length L is 1, a first incident angle θ1 may be 33.5 degrees smaller than the critical angle, i.e., 42 degrees. According to an example embodiment, since it is constructed such that the first incident angle θ1 is 33.5 degrees, the first totally reflected light inside the electronic device 101 may be transmitted to the outside by being refracted at the interface.

According to an example embodiment, a path of light transmitted to the outside due to the first incident angle θ1 smaller than the critical angle may be referred to as a first optical path. According to an example embodiment, light having the first optical path may be reflected from the side face 210C of the housing 210 and emitted to the outside.

According to an example embodiment, when the chamfer region 332 is constructed such that the ratio of the height H and length L is 3, the second incident angle θ2 of the light may be 61.3 degrees greater than the critical angle of 44.3 degrees. According to an example embodiment, since it is constructed such that the second incident angle θ2 is 61.3 degrees, the first totally reflected light inside the electronic device may be totally reflected at the interface and thus reach the shielding printed layer 390 constructed in the second region 333.

According to an example embodiment, a path through which the secondly totally reflected light passes due to the second incident angle θ2 greater than the critical angle may be referred to as a second optical path. According to an example embodiment, the light having the second optical path may be absorbed into the shielding printed layer 390 or emitted to the inside of the electronic device 101 (e.g., an inner face of the housing).

According to an example embodiment, due to the second total reflection (the second optical path) at the interface between the chamfer region 332 and the air, the electronic device 101 may reduce light leaking in a region other than the display. According to an example embodiment, since the light leaking to the outside is reduced, the electronic device 101 may have an improved appearance. In addition, a user's experience of using the electronic device 101 may increase. Accordingly, quality of the electronic device 101 may be improved.

Figure 6:
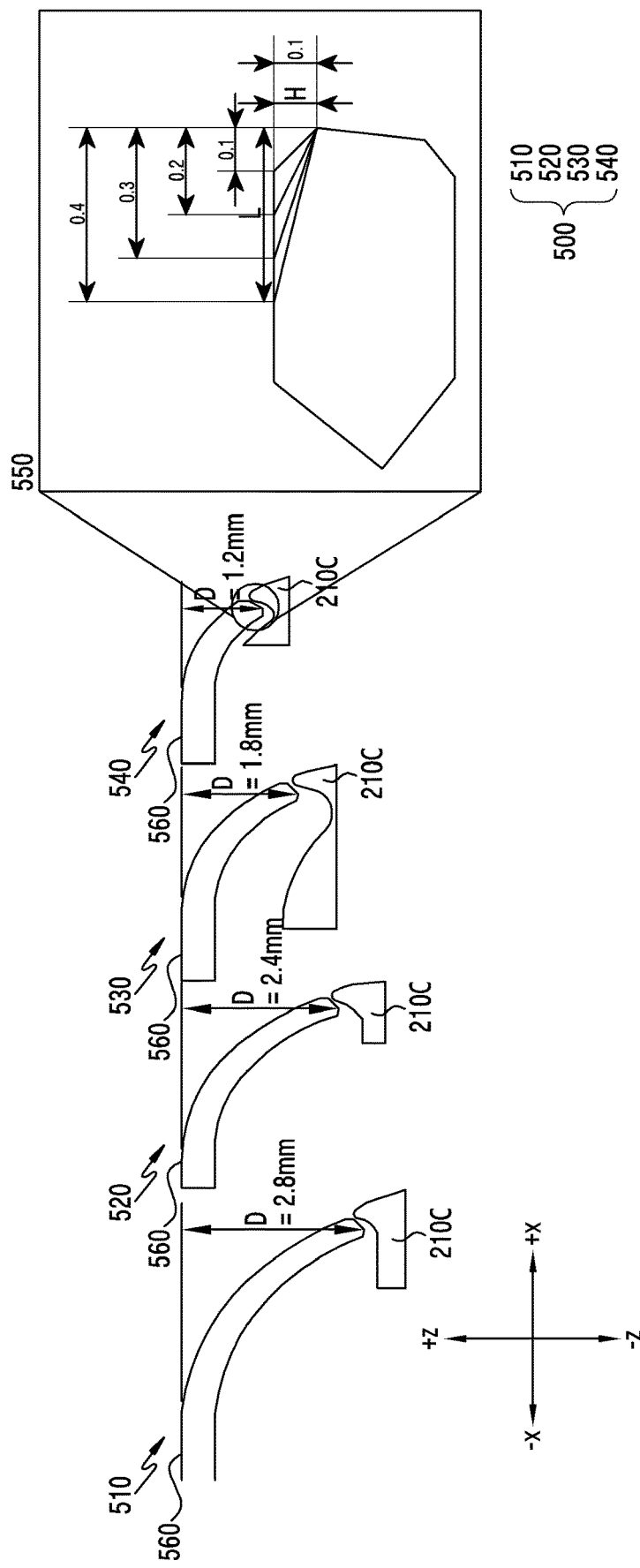
FIG. 6 is an internal cross-sectional view comparing a deployment structure of an electronic device, according to various example embodiments.

FIG. 6 is an internal cross-sectional view comparing a deployment structure of the electronic device, according to various example embodiments.

Figure 7:
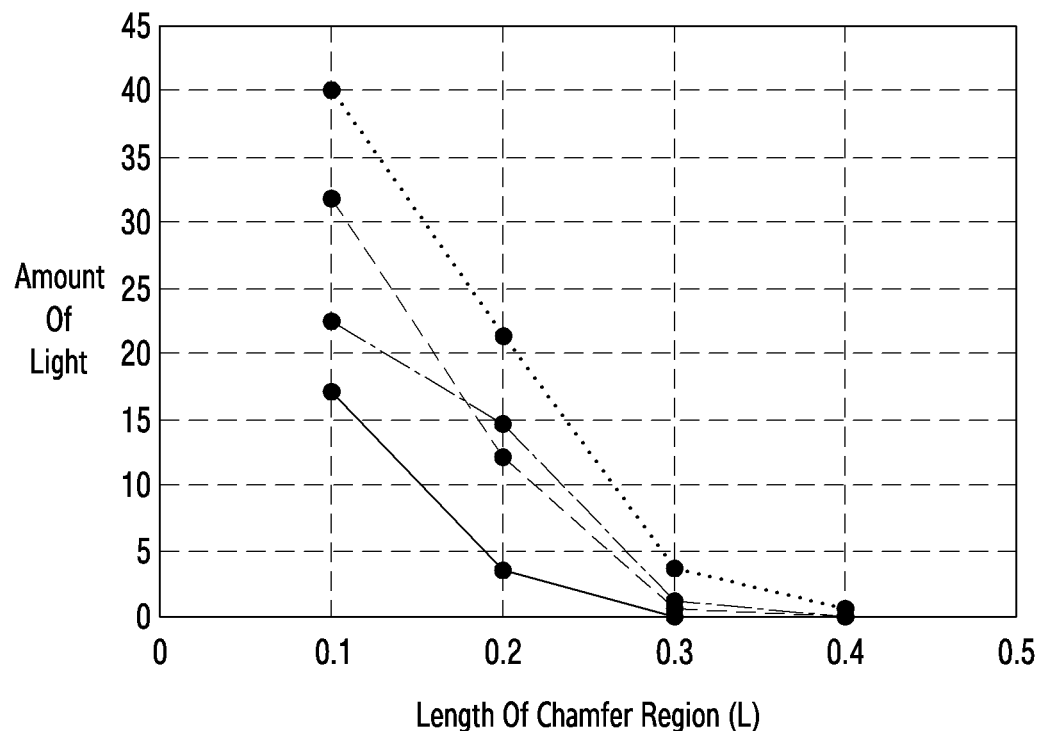
FIG. 7 is a graph for comparing an amount of light emitted to the outside depending on a length of a chamfer region of an electronic device, according to an example embodiment.

FIG. 7 is a graph for comparing an amount of light emitted to the outside depending on a length L of a chamfer region 550 of the electronic device 101, according to an example embodiment.

According to an example embodiment, FIG. 6 illustrates a change of a height D of a glass 500 of the electronic device 101 and a change of the length L of the chamfer region 550.

According to an example embodiment, the glass 500 of FIG. 6 may refer to the glass 310 of FIG. 3. For example, the chamfer region 550 of the glass 500 of FIG. 6 may refer to the chamfer region 332 of the glass 310 of FIG. 3.

According to an example embodiment, on one axis (e.g., z-axis), the glass 500 may have a height D, where the height D is from one end of a curved portion 330 of the glass 500 of FIG. 5 to a flat portion 560 of the glass 500.

According to an example embodiment, the height D may mean a height of the glass 500. According to an example embodiment, the height D may have a value in the range of about 1.0 mm to 3.0 mm, but is not limited thereto.

According to an example embodiment, the glass 500 of the electronic device 101 may include a first glass 510, a second glass 520, a third glass 530, and a fourth glass 540.

According to an example embodiment, the first glass 510 may be constructed to have a height D of about 2.8 mm, but is not limited thereto.

According to an example embodiment, the second glass 520 may be constructed to have a height D of about 2.4 mm, but is not limited thereto. According to an example embodiment, the third glass 530 may be constructed to have a height D of about 1.8 mm, but is not limited thereto.

According to an example embodiment, the fourth glass 540 may be constructed to have a height D of about 1.2 mm, but is not limited thereto.

According to an example embodiment, an amount of light emitted to the outside of the electronic device 101 described below may vary depending on the height D of the glass 500.

According to an example embodiment, an interface between the chamfer region 550 of the glass 500 and the air may vary depending on a ratio of a height H and length L of the chamfer region 550.

According to an example embodiment, as described above, the chamfer region 550 may be constructed such that the ratio of the height H and length L is in the range of 2 to 4.

For example, the chamfer region 550 may be constructed to have a length L in the range of about 0.1 mm to 0.4 mm According to an example embodiment, since it is constructed such that the length L is in the range of about 0.1 mm to 0.4 mm, the height H of the chamfer region 550 corresponding thereto may be in the range of 0.025 mm to 0.2 mm.

According to another example embodiment, the chamfer region 550 may be constructed to have a height H in the range of 0.05 mm to 0.15 mm According to an example embodiment, since it is constructed such that the height H is in the range of 0.05 mm to 0.15 mm, the length L of the chamfer region 550 corresponding thereto may be a value in the range of 0.1 mm to 0.6 mm.

According to an example embodiment, Table 1 shown below is an example in which an amount of light emitted to the outside of the electronic device 101 depending on the length L of the chamfer region 550 and the height D of the glass 500 is expressed by a relative numerical value. According to an example embodiment, Table 1 is an example showing a relative numerical value in a state where the height H of the chamfer region 550 is fixed to 0.1 mm. According to an example embodiment, a horizontal legend of Table 1 indicates the height D of the glass 500. In addition, a vertical legend in Table 2 indicates the length L of the chamfer region 550 when the height H of the chamfer region 550 is 0.1 mm.

According to an example embodiment, FIG. 7 is a graph showing the relative numerical value of Table 1.

According to an example embodiment, an amount of light described below may mean an amount of light emitted to the outside of the electronic device 101 through the chamfer region 550. Alternatively, the amount of light described below may mean an amount of light leaking in a region other than a display region.

TABLE 1

| The amount of light (Height(H) = 0.1 mm) | D = 2.8 mm | D = 2.4 mm | D = 1.8 mm | D = 1.2 mm |
|---|---|---|---|---|
| L = 0.1 mm(L/H = 1) | 17 | 32 | 23 | 40 |
| L = 0.2 mm(L/H = 2) | 4 | 12 | 15 | 21 |
| L = 0.3 mm(L/H = 3) | 0 | 0 | 1 | 4 |
| L = 0.4 mm(L/H = 4) | 0 | 0 | 0 | 0 |

Referring to Table 1, when the amount of light is 0, it may mean that light emission to the outside of the electronic device is completely blocked. According to an example embodiment, when a value indicating the amount of light is high, it may mean that the amount of light emitted to the outside of the electronic device 101 is relatively greater than when the value indicating the amount of light is small. For example, when the height D of the glass 500 is 2.4 mm and the length L of the chamfer region 550 is 0.1 mm, the value indicating the amount of light may be expressed by 32. In addition, when the height D of the glass 500 is 2.4 mm and the length L of the chamfer region 550 is 0.2 mm, the value indicating the amount of light may be expressed by 12. Therefore, when the length L of the chamfer region 550 becomes longer (e.g., 0.2 mm rather than 0.1 mm) at the same height D (e.g., 2.4 mm) of the glass 500, the amount of light emitted to the outside may be smaller.

According to an example embodiment, in a state where the height H of the chamfer region 550 is fixed to 0.1 mm, the chamfer region 550 may be constructed to have a length L of 0.1 mm, 0.2 mm, 0.3 mm, and 0.4 mm. In addition, in a state where the height H of the chamfer region 550 is fixed to 0.1 mm, the glass 500 may be constructed to have a height D of 1.2 mm, 1.8 mm, 2.4 mm, and 2.8 mm.

A first graph 710 illustrates an amount of light depending on the length L of the chamfer region 550, when the glass 500 is constructed to have a height D of 2.8 mm. A second graph 720 illustrates an amount of light depending on the length L of the chamfer region 550, when the glass 500 is constructed to have a height D of 2.4 mm. A third graph 730 illustrates an amount of light depending on the length L of the chamfer region 550, when the glass 500 is constructed to have a height D of 1.8 mm. A fourth graph 740 illustrates an amount of light depending on the length L of the chamfer region 550, when the glass 500 is constructed to have a height D of 1.2 mm.

Referring to the first group 710 to the fourth group 740 according to an example embodiment, it may be seen that, when the length L of the chamfer region 500 is identical, an amount of light is substantially reduced in proportion to an increase in the height D of the glass 500 according to an example embodiment.

For example, when the chamfer region 500 is constructed to have a length of 0.2 mm, the amount of light may be 4 in the first graph 710, and the amount of light may be 12 in the second group 720. In addition, when the chamfer region 500 is constructed to have a length L of 0.2 mm, the amount of light may be 15 in the third graph 730, and the amount of light may be 21 in the second group 740. Therefore, referring to the first group 710 to the fourth group 740, the amount of light may be reduced in proportion to an increase in the height D of the glass 500 in a state where the length L of the chamfer region 550 is identical.

According to another example embodiment, when the chamfer region is constructed to have a length L of 0.1 mm, the amount of light may be 40 in the fourth graph 740. In addition, when the chamfer region 500 is constructed to have a length L of 0.2 mm, the amount of light may be 21 in the fourth graph 740. In addition, according to an example embodiment, when the chamfer region 550 is constructed to have a length L of 0.2 mm, the amount of light may be 12 in the second graph 720, and when the chamfer region 550 is constructed to have a length L of 0.3 mm, the amount of light may be 0 in the second graph 720.

Therefore, referring to the first graph 710 to the fourth graph 740, when the glass 500 is configured to have the same height D, the amount of light may be reduced in proportion to an increase in the length L of the chamfer region 550 according to an example embodiment.

Referring to Table 1 and the graph of FIG. 7, when the ratio L/H of the length L of the chamfer region and the height H of the chamfer region has a value in the range of 2 to 4 according to an example embodiment, an amount of light leaking to a region other than the display 201 of the electronic device 101 may be significantly reduced.

For example, when the height D of the glass 500 is 1.2 mm, the amount of light may be 40 if the ratio L/H of the length L and height H of the chamfer region 550 is 1. In addition, when the glass 500 has the same height D, the amount of light may be 21 if the ratio L/H of the length L and height H of the chamfer region 550 is 2. In addition, the amount of light may be 4 if the ratio L/H of the length L and height H of the chamfer region 550 is 3.

Referring to Table 1 and FIG. 7, when the chamfer region 550 is constructed such that the ratio L/H of the length L and height H is a value in the range of 2 to 4 according to an example embodiment, the amount of light may be significantly reduced. According to an example embodiment, since the amount of light leaking to the region other than the display is reduced, the electronic device 101 may have an improved appearance. In addition, a user's experience of using the electronic device 101 may increase. Accordingly, quality of the electronic device 101 may be improved.

Figure 8:
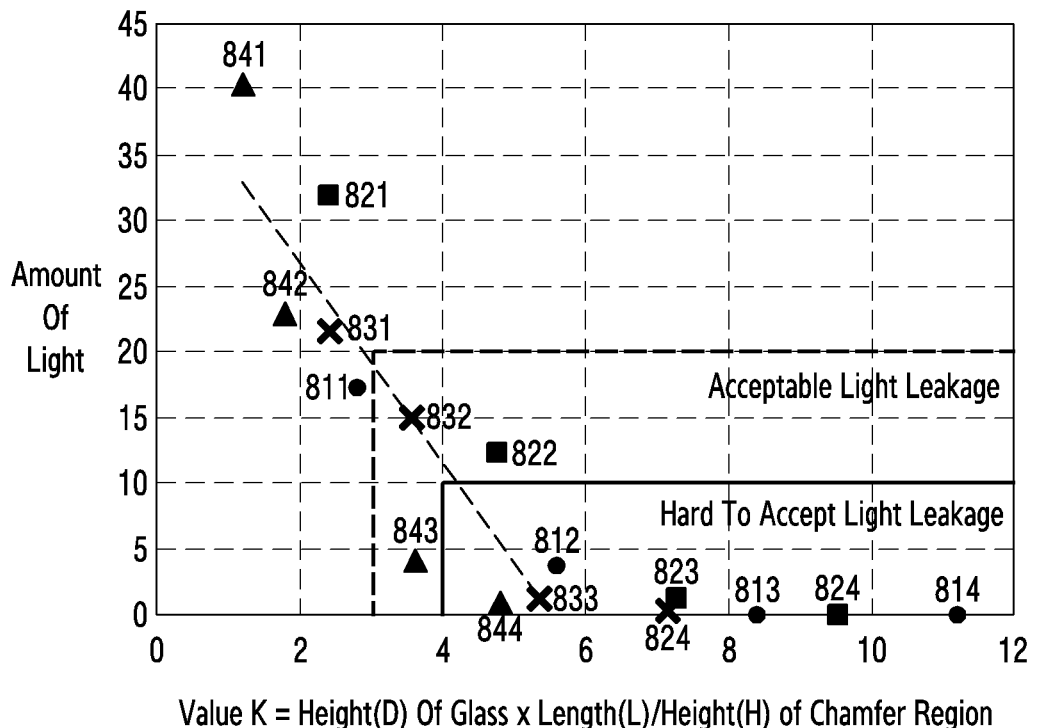
FIG. 8 is a graph for comparing an amount of light emitted to the outside depending on a value obtained by dividing a product of a height of glass of an electronic device and a length of a chamfer region by a height of the chamfer region, according to an example embodiment.

FIG. 8 is a graph for comparing an amount of light emitted to the outside depending on a value (D×L/H) obtained by dividing a product of the height D of the glass 500 of the electronic device 101 and the length L of the chamfer region 550 by the height H of the chamfer region 550, according to an example embodiment.

According to an example embodiment, Table 2 is an example in which the amount of light emitted to the outside of the electronic device 101 depending on the value (D×L/H) obtained by dividing the product of the height D of the glass 500 and the length L of the chamfer region 550 by the height H of the chamfer region 550 is expressed by a relative numerical value. According to an example embodiment, Table 2 is an example showing a relative numerical value indicating an amount of light emitted to the outside in a state where the height H of the chamfer region 550 is fixed to 0.1 mm.

According to an example embodiment, FIG. 8 is a graph showing the relative numerical value of Table 2.

According to an example embodiment, an amount of light described below may mean an amount of light emitted to the outside of the electronic device 101 through the chamfer region 550 of FIG. 6.

According to an example embodiment, the value (D×L/H) obtained by dividing the product of the height D of the glass 500 and the length L of the chamfer region 550 by the height H of the chamfer region 550 may be defined as a value K.

TABLE 2

| Height of glass(D) | The length L of the chamfer region (L) (Height (H) = 0.1 mm) | D × L/H = K | The amount of light |
|---|---|---|---|
| 2.80 | 0.1 | 2.80 | 17 |
| 2.80 | 0.2 | 5.59 | 4 |
| 2.80 | 0.3 | 8.39 | 0.00 |
| 2.80 | 0.4 | 11.19 | 0.00 |
| 2.38 | 0.1 | 2.38 | 31.84 |
| 2.38 | 0.2 | 4.76 | 12.25 |
| 2.38 | 0.3 | 7.14 | 0.38 |
| 2.38 | 0.4 | 9.52 | 0.00 |
| 1.78 | 0.1 | 1.78 | 22.56 |
| 1.78 | 0.2 | 3.57 | 14.79 |
| 1.78 | 0.3 | 5.35 | 1.09 |
| 1.78 | 0.4 | 7.14 | 0.00 |
| 1.20 | 0.1 | 1.20 | 40.09 |
| 1.20 | 0.2 | 2.39 | 21.44 |
| 1.20 | 0.3 | 3.59 | 3.69 |
| 1.20 | 0.4 | 4.79 | 0.41 |

Referring to Table 2, when the amount of light is 0, it may mean that light emission to the outside of the electronic device 101 is completely blocked. According to an example embodiment, when a value indicating the amount of light is high, it may mean that the amount of light emitted to the outside of the electronic device 101 is relatively greater than when the value indicating the amount of light is small. For example, when the height D of the glass 500 is 2.80 mm and the length L of the chamfer region 550 is 0.1 mm, the value K may be 2.8. According to an example embodiment, when the value K is 2.8, the amount of light may be 17. According to another example embodiment, when the height D of the glass 500 is 2.80 mm and the length L of the chamfer region 550 is 0.2 mm, the value K may be 5.59. According to an example embodiment, when the value K is 5.59, the amount of light may be 4. According to an example embodiment, the amount of light may be reduced in proportion to an increase in the value K.

Referring to FIG. 8, a first graph 810 is a graph for comparing the amount of light when the height D of the glass 500 is 2.80 mm, according to an example embodiment. According to another example embodiment, a second graph 820 is a graph for comparing the amount of light when the height D of the glass 500 is 2.38 mm, according to an example embodiment. According to another example embodiment, a third graph 830 is a graph for comparing the amount of light when the height D of the glass 500 is 1.78 mm, according to an example embodiment. According to another example embodiment, a fourth graph 840 is a graph for comparing the amount of light when the height D of the glass 500 is 1.20 mm, according to an example embodiment.

According to an example embodiment, the first graph 810 may include a first point 811, a second point 812, a third point 813, and a fourth point 814.

According to an example embodiment, the second graph 820 may include a first point 821, a second point 822, a third point 823, and a fourth point 824.

According to an example embodiment, the third graph 830 may include a first point 831, a second point 832, a third point 833, and a fourth point 834.

According to an example embodiment, the first graph 840 may include a first point 841, a second point 842, a third point 843, and a fourth point 844.

Referring to the first graph 810, the second graph 820, the third graph 830, and the fourth graph 840, it may be seen that the amount of light is reduced in proportion to an increase in the product (D×L) of the height D of the glass 500 and the length L of the chamfer region 550, in a state where the height H of the chamfer region 550 is fixed.

According to an example embodiment, the first point 811 may mean an amount of light when the height D of the glass 500 is 2.80 mm, the length L of the chamfer region 550 is 0.1 mm, and the height H of the chamfer region 550 is 0.1 mm Therefore, the first point 811 may mean a case where the value K is 2.8 and the amount of light is 17.

According to an example embodiment, the second point 812 may mean an amount of light when the height D of the glass 500 is 2.80 mm, the length L of the chamfer region 550 is 0.2 mm, and the height H of the chamfer region 550 is 0.1 mm Therefore, the second point 812 may mean a case where the value K is 5.59 and the amount of light is 4.

According to an example embodiment, the third point 813 may mean an amount of light when the height D of the glass 500 is 2.80 mm, the length L of the chamfer region 550 is 0.3 mm, and the height H of the chamfer region 550 is 0.1 mm Therefore, the third point 813 may mean a case where the value K is 8.39 and the amount of light is 0.

According to an example embodiment, the fourth point 814 may mean an amount of light when the height D of the glass 500 is 2.80 mm, the length L of the chamfer region 550 is 0.4 mm, and the height H of the chamfer region 550 is 0.1 mm Therefore, the fourth point 814 may mean a case where the value K is 11.19 and the amount of light is 0.

According to another example embodiment, the first point 821 of the second graph 820 may mean a case where the value K is 2.38 and the amount of light is 31.84. According to another example embodiment, the third point 833 of the third graph 830 may mean a case where the value K is 5.35 and the amount of light is 1.09.

Referring to FIG. 8 according to an example embodiment, when the amount of light is less than or equal to 20, it may mean that only part of light introduced into the glass 500 is emitted to the outside of the electronic device 101. In addition, when the amount of light is less than or equal to 10, it may mean that the entirety of the light introduced into the glass 500 is not emitted to the outside of the electronic device 101.

According to an example embodiment, when the electronic device 101 has a value K in the range of 3 to 4, the electronic device 101 may have an amount of light less than or equal to 20. According to an example embodiment, the electronic device 10 of which the amount of light is less than or equal to 20 may have an improved appearance. In addition, a user's experience of using the electronic device 101 may increase.

According to an example embodiment, when the electronic device 101 has a value K in the range of 4 to 12, the electronic device 101 may have an amount of light less than or equal to 10. However, the range of the value K is not limited thereto. For example, the electronic device 101 may have a value K exceeding 12.

According to an example embodiment, an amount of light leaking in a region other than a display may be reduced in the electronic device 101 of which the amount of light is less than 10, compared to the electronic device 101 of which the amount of light is less than 20. Therefore, the electronic device 101 of which the amount of light is less or equal to 10 may have an improved appearance. In addition, a user's experience of using the electronic device 101 may increase. Accordingly, quality of the electronic device 101 may be improved.

Figure 9:
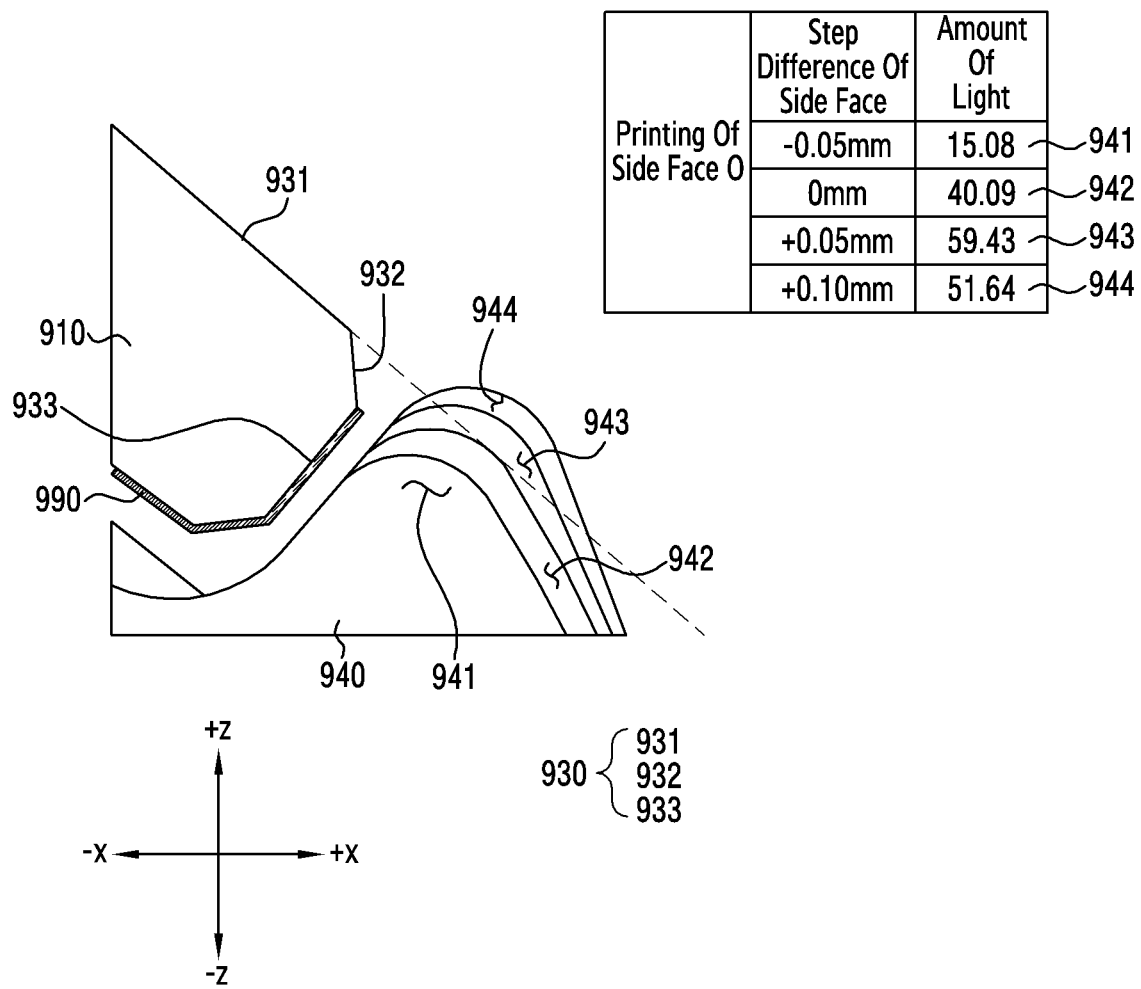
FIG. 9 is a cross-sectional view illustrating an internal deployment structure of an electronic device according to another example embodiment.

FIG. 9 is a cross-sectional view illustrating an internal deployment structure of the electronic device 101 according to another example embodiment.

According to an example embodiment, a glass 910 may refer to the glass 310 of FIG. 3.

According to an example embodiment, the side face 210C of the housing 210 of FIG. 2A may refer to a side face 940 of a housing of FIG. 9. For example, the side face 940 of FIG. 9 may omit or add some components on the side face 210C of FIG. 2A.

According to an example embodiment, a curved portion 930 of the glass 910 may include a first region 931, a chamfer region 932, and a second region 933. According to an example embodiment, a shielding printed layer 990 may be provided on the second region 933 of the curved portion 930. According to an example embodiment, the second region 933 may face the side face 940 of the housing 210 of the FIG. 2A.

According to an example embodiment, the side face 940 of the electronic device 101 may be constructed to have a height corresponding to the curved portion 930 of the glass 910. According to another example embodiment, the side face 940 of the housing 210 may be constructed to have the same height or a specific height difference with respect to the first region 931 of the curved portion 930 of the glass 910.

According to an example embodiment, the side face 940 of the housing 210 may include any one of a first side face 941, a second side face 942, a third side face 943, and a fourth side face 944. According to an example embodiment, the side face 940 of the housing 210 may be constructed to be lower by 0.05 m or higher by 0.10 m with respect to the first region 931 according to one of the first side face 941, the second side face 942, the third side face 943, and the fourth side face 944.

Since the height of the side face 940 of the housing 210 is decreased with respect to the first region 931, a region in which light is reflected in the chamfer region 932 may be decreased. Accordingly, since the region in which light is reflected on the side face 940 is decreased, an amount of light emitted to the outside of the electronic device may be reduced.

For example, the first side face 941 of the electronic device 101 may be constructed to have a height lower by 0.05 mm with respect to the first region 931. According to an example embodiment, when constructed to have the height lower by 0.05 mm, the amount of light may have a value of 15.08.

According to an example embodiment, the second side face 942 may be constructed to have a height corresponding to the first region 931. According to an example embodiment, when constructed to have the corresponding height, the amount of light may have a value of 40.09.

According to an example embodiment, the third side face 943 may be constructed to have a height higher by 0.05 mm with respect to the first region 931. According to an example embodiment, when constructed to have the height higher by 0.05 mm, the amount of light may have a value of 59.43.

According to an example embodiment, the fourth side face 944 may be constructed to have a height higher by 0.10 mm with respect to the first region 931. According to an example embodiment, when constructed to have the height higher by 0.10 mm, the amount of light may have a value of 51.64.

According to an example embodiment, when the side face 940 is constructed to have a height lower by 0.05 mm with respect to the first region 931, a region in which light is reflected on the side face 940 may be decreased. According to an example embodiment, since the region in which the light is reflected is decreased, an amount of light emitted to the outside of the electronic device 101 may be reduced. According to an example embodiment, since an amount of light emitted to the outside is reduced, the electronic device 101 may have an improved appearance. In addition, a user's experience of using the electronic device 101 may increase.

However, the height of the side face 940 of the electronic device 101 is not limited thereto. For example, the side face 940 of the electronic device 101 may be constructed to have a height lower by 0.05 mm with respect to the first region 931.

According to another example embodiment, the side face 940 of the electronic device 101 may be constructed to have a height lower by 0.10 mm with respect to the first region 931.

Figure 10:
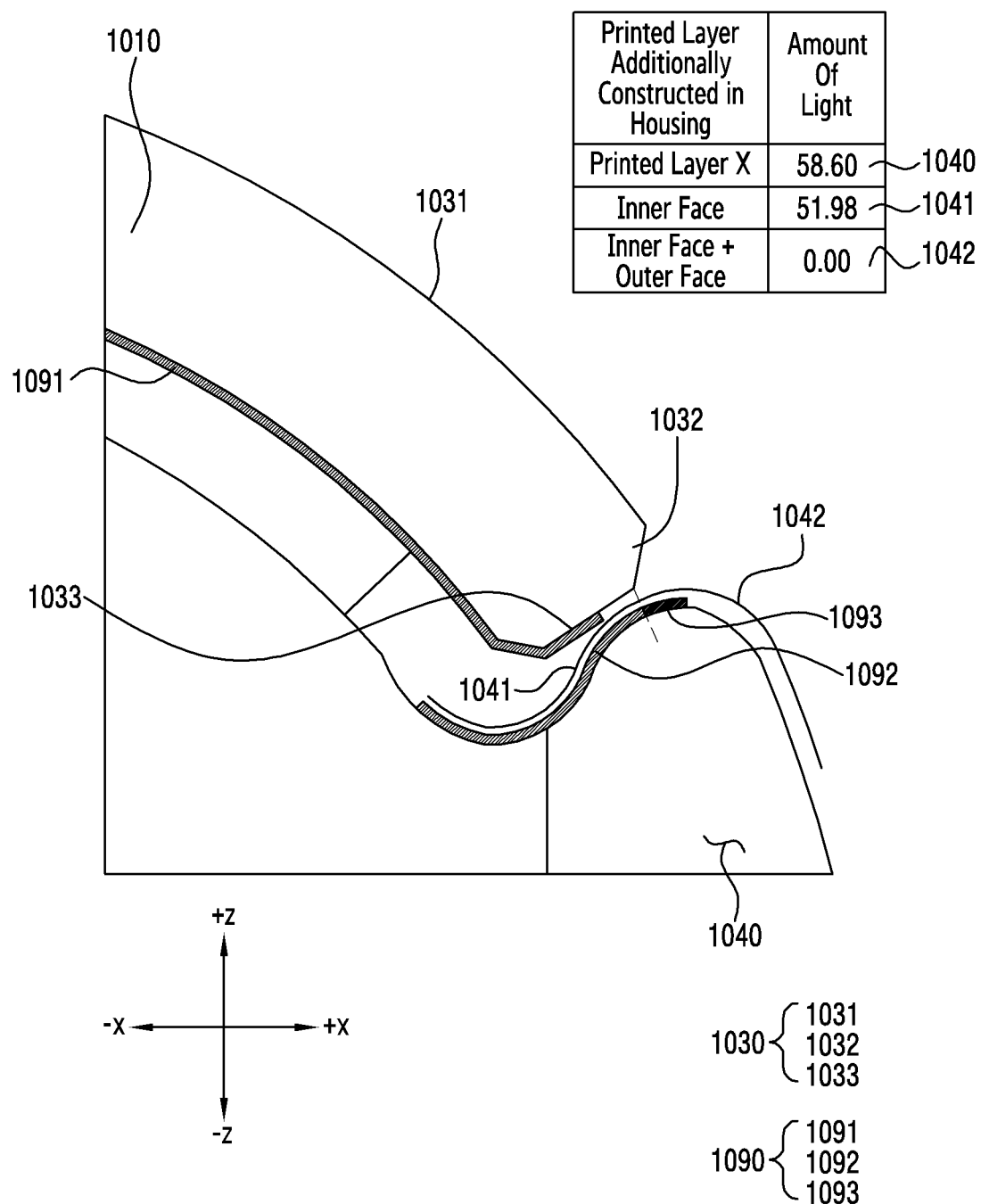
FIG. 10 is a cross-sectional view illustrating an internal deployment structure of an electronic device according to another example embodiment.

FIG. 10 is a cross-sectional view illustrating an internal deployment structure of the electronic device 101 according to another example embodiment.

FIG. 10 illustrates a case where a shielding printed layer 1090 of the electronic device 101 is provided on the side face 210C of the housing 210 of the electronic device 101, according to an example embodiment. According to an example embodiment, a side face 1040 of the housing 210 of FIG. 10 may refer to the side face 210C of the housing 210 of FIG. 2A.

According to an example embodiment, the side face 1040 of the housing 210 may include an inner face 1041 and an outer face 1042. For example, the side face 1040 of the housing 210 may include the outer face 1042 exposed to the outside of the electronic device and the inner face 1041 constructed in an inner space of the electronic device 101.

According to an example embodiment, the inner face 1041 may extend from one end of the outer face 1042 toward the inside of the electronic device 101. According to another example embodiment, the inner face 1041 extending toward the inside of the electronic device 101 may be constructed to face a second region 1033 on the curved portion 1030 of a glass 1010.

Referring to FIG. 10, according to an example embodiment, the outer face 1042 and the inner face 1041 may be constructed as a curved face having a specific curvature. For example, part of the outer face 1042 may constitute a curved face and may be adjacent to the second region 1033, and part of the inner face 1041 may constitute a curved face and may be spaced apart from the second region 1033. However, the shape of the outer face 1042 and inner face 1041 is not limited thereto. For example, the outer face 1042 and the inner face 1041 may be constructed to be inclined with a specific inclination.

According to an example embodiment, the electronic device 101 may include the glass 1010 and/or the shielding printed layer 1090 constructed in the housing 210. For example, the shielding printed layer 1090 may include a first shielding printed layer 1091 constructed on the second region 1033 of the glass 1010. According to an example embodiment, the first shielding printed layer 1091 may be constructed by covering only part of the second region 1033. However, a region covered by the first shielding printed layer 1091 is not limited thereto. For example, the first shielding printed layer 1091 may be constructed by covering the entirety of the second region 1033.

According to an example embodiment, the shielding printed layer 1090 may be additionally constructed on the side face 1040 of the housing 210.

According to an example embodiment, the shielding printed layer 1090 may be constructed by covering at least part of the inner face 1041. For example, the shielding printed layer 1090 may further include a second shielding printed layer 1092 covering the inner face 1041 facing the second region 1033.

In addition, according to an example embodiment, the shielding printed layer 1090 may further include a third shielding printed layer 1093 further covering at least part of the outer face 1042. For example, the third shielding printed layer 1093 may cover at least part of the outer face 1042 by extending from at least part of the inner face 1041 toward the outside of the electronic device 101. According to an example embodiment, the third shielding printed layer 1093 may be constructed by extending from one end of the second shielding printed layer 1092 toward the outside of the electronic device 101.

According to an example embodiment, the third shielding printed layer 1093 may be constructed from one end of the second shielding printed layer 1092 up to a portion constituting a curved face of the external face 1042. For example, the third shielding printed layer 1093 constitutes the curved face of the external face 1042 at one end of the second shielding printed layer 1092 and may be constructed by extending up to a region adjacent to the second region 1033.

According to an example embodiment, the shieling printed layer 1090 including the first shielding printed layer

1091, the second shielding printed layer 1092, and the third shielding printed layer may refer to the shielding printed layer 390 of FIG. 3.

According to an example embodiment, when the second shieling printed layer 1092 is constructed on the inner face 1041, the amount of light leaking to the outside of the electronic device 101 may have a value of 51.98.

According to another example embodiment, when the third shielding printed layer 1093 is further constructed on the outer face 1042 together with the second shieling printed layer 1092, the amount of light leaking to the outside of the electronic device 101 may have a value of 0.

According to another example embodiment, when the second shielding printed layer 1092 and the third shieling printed layer 1093 are not constructed on the side face 1040 of the housing 210, quantity of light (hereinafter, amount of light) emitted to the outside of the electronic device 101 may have a value of 58.60.

According to an example embodiment, light refracted through the chamfer region 1032 may be absorbed into the second shielding printed layer 1092 constructed on the inner face 1041. In addition, according to an example embodiment, the light refracted through the chamfer region 1032 may be absorbed into the third shielding printed layer 1093 constructed on the outer face 1042. Since the light is absorbed into the second shieling printed layer 1092 and/or the third shielding printed layer 1093, the amount of light leaking to the outside of the electronic device 101 may be significantly reduced. Since the amount of light leaking to the outside of the electronic device 101 is reduced, the electronic device 101 may have an improved appearance. In addition, a user's experience of using the electronic device 101 may increase. Accordingly, quality of the electronic device 101 may be improved.

According to an example embodiment, the side face 1040 of the housing 210 may be constructed of a material which allows to have low reflectance in replacement of the shielding printed layer 1090.

For example, the side face of the housing 210 may be constructed of a material which allows to have a reflectance in the range of 1% to 3% in replacement of the shielding printed layer 1090. According to another example embodiment, the side face 1040 may be constructed to have a black color in replacement of the shieling printed layer 1090. According to an example embodiment, the side face 1040 having the black color may have reflectance less than or equal to 10%.

However, the reflectance and color of the side face 1040 are not limited thereto. For example, the side face 1040 may be constructed to have a dark gray color.

According to an example embodiment, since the reflectance of the side face 1040 is reduced, the electronic device 101 may block light emitted to the outside even without the shielding printed layer 1090. By blocking the light emitted to the outside, the electronic device 101 may increase convenience or usability of a user viewing the display 201.

Figure 11:
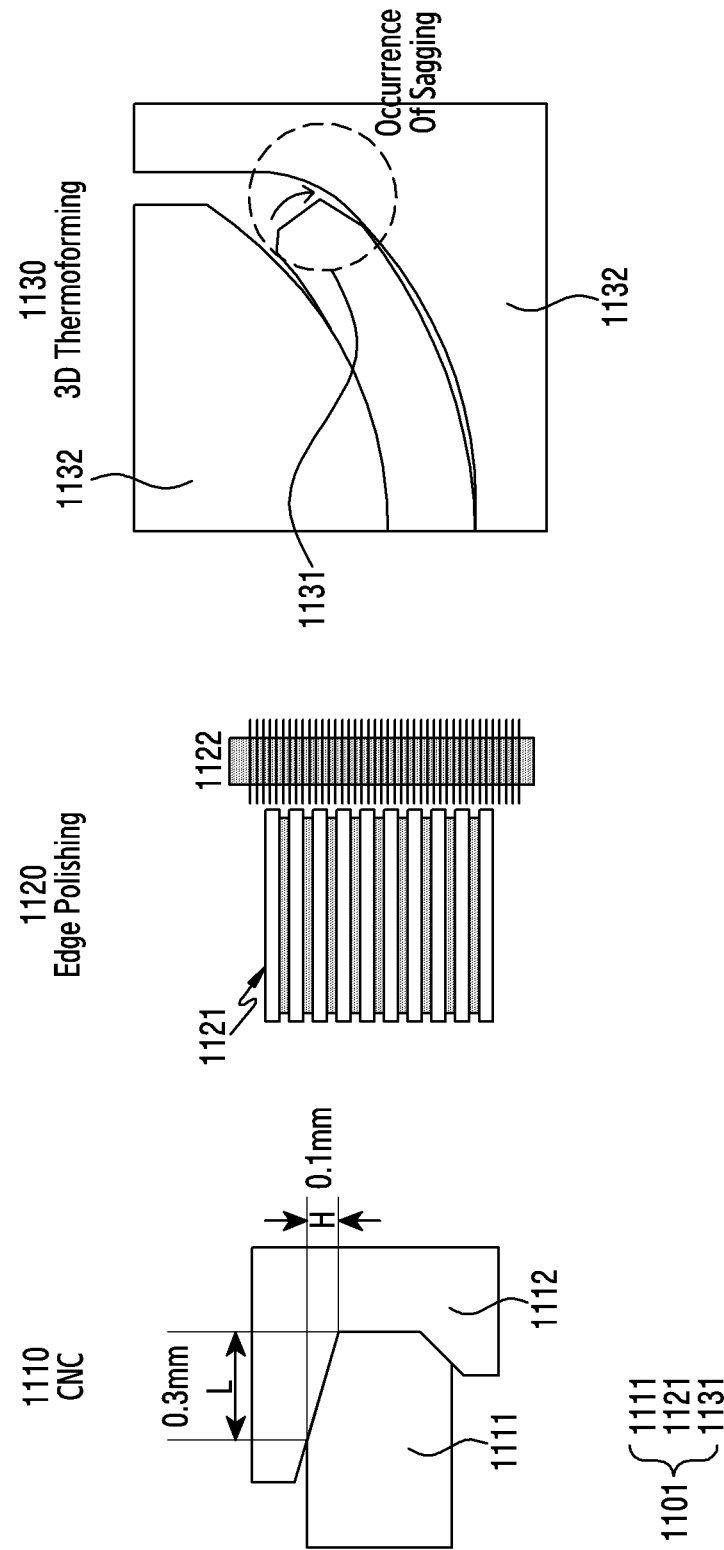
FIG. 11 illustrates a manufacturing process of an electronic device, according to various example embodiments.

FIG. 11 illustrates a manufacturing process of the electronic device 101, according to various example embodiments.

According to an example embodiment, referring to FIG. 11, a process of processing a chamfer region 1111 of glass 1101 is illustrated. According to an example embodiment, the glass 1101 of FIG. 11 may refer to the aforementioned glass 310 of FIG. 3.

According to an example embodiment, the glass 1101 may be constructed by a first process 1110, a second process 1120, and a third process 1130.

According to an example embodiment, the first process 1110 may include a Computer Numerical Control (CNC) process. According to an example embodiment, the chamfer region 1111 may be constructed by using a CNC device 1112 having a size corresponding to a height H and length L of the chamfer region 1111.

According to an example embodiment, when the chamfer region 1111 is increased, chipping in which an interface is dropped in part may occur or the interface may not be processed in part in the first process 1110.

Therefore, the chamfer region 1111 may require a size optimized for the first process 1110 in order to solve the problem in that the chipping occurs or the interface is not processed in part. According to an example embodiment, when the ratio of the length L and height H of the chamfer region 1111 has a value in the range of 2 to 4, the chamfer region 1111 may have a size optimized for the first process 1110, thereby solving the problem in that the chipping occurs or the interface is not processed in part.

According to an example embodiment, the second process 1120 may include an edge polishing process. According to an example embodiment, the chamfer region 1121 processed by the first process 1110 may be polished by a brush 1122. For example, the chamfer 1121 of which an interface is not processed in part or which is subjected to the chipping may constitute an interface processed by being polished by the brush 1122.

According to an example embodiment, when a size of the chamfer region 1121 is increased, the interface of the chamfer region 1121 may be not polished in part or the interface may be non-uniformly polished in the second process 1120. Therefore, a size optimized for the second process 1120 may be required to solve the problem of non-polishing or non-uniform polishing. According to an example embodiment, when the ratio of the length L and height H of the chamfer region 112 has a value in the range of 2 to 4, the chamfer region 1121 may have a size optimized for the second process 1120, thereby solving the problem of non-polishing or non-uniform polishing.

According to an example embodiment, the third process 1130 may include a thermoforming process. According to an example embodiment, a chamfer region 1131 may be constructed by being heated inside a mold core 1132.

According to an example embodiment, when the size of the chamfer region 1131 is increased, one end of the glass may be sagged at a high temperature during the third process. Therefore, disappearing may occur in the chamfer region 1131.

Accordingly, in order to solve the problem of the sagging in one end of the glass at the high temperature or the disappearing of the chamfer region 1131, a size of the chamfer region 1131, optimized for the third process 1131, may be required.

According to an example embodiment, when the ratio of the length L and height H of the chamfer region 1131 has a value in the range of 2 to 4, the chamfer region 1131 may have a size optimized for the third process 1130, thereby solving the problem of the sagging in one end of the glass at the high temperature or the disappearing of the chamfer region 1131.

According to various example embodiments, an electronic device includes a display, a housing constituting at least part of a side face and rear face of the electronic device, glass disposed on the display and constituting a front face of the electronic device, wherein the glass includes a first face exposed to the outside of the electronic device and a second face other than the first face, and a shielding printed layer constructed in a region corresponding to a space between the side face and an edge of the display, on the second face of the glass. The glass may include a flat portion and a curved portion which is bent from the flat portion toward the side face. On the curved portion of the glass, one end adjacent to the side face may include a first region having a curvature of the curved position, a second region perpendicular to the first region and covered by the shielding printed layer, and a chamfer region constructed between the first region and the second region. A ratio of a height of the chamfer region with respect to the first region and a length of the chamfer region with respect to the second region may have a value in the range of 2 to 4.

According to an example embodiment, the shielding printed layer may cover the entirety of the second region of the curved portion of the glass.

According to an example embodiment, the housing may include an outer face constituting a side face of the electronic device and exposed to the outside, and an inner face extending from one end of the outer face toward the inside of the electronic device and facing the second region on the curved portion of the glass. The shielding printed layer may include a first shielding printed layer constructed in the second region of the curved portion of the glass, and a second shielding layer facing at least part of the first shielding printed layer and constructed on the inner face.

According to an example embodiment, the shielding printed layer may further include a third shielding printed layer extending from one end of the second shielding printed layer to cover at least part of the outer face of the housing.

According to an example embodiment, the side face of the electronic device may be constructed to be lower by 0.05 mm with respect to the first region.

According to an example embodiment, the housing may be constructed of a metallic material.

According to an example embodiment, the length of the chamfer region may have a value in the range of 0.1 mm to 0.4 mm.

According to an example embodiment, the height of the chamfer region may have a value in the range of 0.05 mm to 0.15 mm.

According to an example embodiment, the side face may be constructed to have a black color.

According to an example embodiment, the housing may be constructed of a material which allows to have low reflectance in the range of 1% to 30%.

According to an example embodiment, the glass may be constructed of a transparent material.

According to an example embodiment, the shielding printed layer may be constructed to cover an edge of the display.

According to an example embodiment, the display may include a foldable display.

According to various example embodiments, an electronic device includes a display, a housing constituting at least part of a side face and rear face of the electronic device, glass disposed on the display and constituting a front face of the electronic device, wherein the glass includes a first face exposed to the outside of the electronic device and a second face other than the first face, and a shielding printed layer constructed in a region corresponding to a space between the side face and an edge of the display, on the second face of the glass. The glass may include a flat portion and a curved portion which is bent from the flat portion toward the side face. The curved portion may include a first region having a curvature of the curved portion, a chamfer region extending from an edge of the first region toward a side face of the housing with a specific inclination, and a second region extending in a direction perpendicular to the first region and constituting a side face of the glass from one end of the chamfer. When a virtual axis extending in a first direction parallel to the second region is defined as a first axis from a first corner where the second region and the chamfer region meet, a virtual axis facing a second direction perpendicular to the first direction on the first axis and extending to a second corner where the first region and the chamfer region meet is defined as a second axis, and a virtual corner where the first axis and the second axis meet is defined as a third corner, a ratio of a first distance between the first corner and third corner of the chamfer region and a second distance between the second corner and third corner of the chamfer region may have a value in the range of 2 to 4.

According to an example embodiment, the shielding printed layer may cover the entirety of the second region of the curved portion of the glass.

According to an example embodiment, the housing may include an outer face constituting a side face of the electronic device and exposed to the outside, and an inner face extending from one end of the outer face toward the inside of the electronic device and facing the second region on the curved portion of the glass. The shielding printed layer may include a first shielding printed layer constructed in the second region of the glass, and a second shielding layer facing at least part of the first shielding printed layer and constructed on the inner face.

According to an example embodiment, the shielding printed layer may further include a third shielding printed layer extending from one end of the second shielding printed layer to cover at least part of the outer face of the housing.

According to an example embodiment, the side face of the electronic device may be constructed to be lower by 0.05 mm with respect to the first region.

The electronic device according to various example embodiments provided in the disclosure may be one of various types of electronic devices. The electronic devices may include, for example, a portable communication device (e.g., a smart phone), a computer device, a portable multimedia device, a portable medical device, a camera, a wearable device, or a home appliance. According to an example embodiment of the disclosure, the electronic devices are not limited to those described above.

It should be appreciated that various example embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., Compact Disc Read Only Memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities. According to various example embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A portable communication device comprising:
a display;
a housing accommodating the display and forming at least part of a sidewall of the portable communication device;
a glass panel covering the display and including a planar portion and a curved portion extended from an edge of the planar portion, the curved portion including a upper surface, a lower surface facing opposite to the upper surface and a side surface, the upper surface including a chamfered portion formed at an ending portion of the upper surface as adjacent to the side surface such that a length of the chamfered portion with respect to the side surface is substantially greater than a height of the chamfered portion with respect to an unchamfered portion of the upper surface; and
an opaque layer covering at least part of the lower surface of the curved portion and at least part of the side surface of the curved portion.

2. The portable communication device of claim 1, wherein the lower surface includes another chamfered portion formed at an ending portion of the lower surface as adjacent to the side surface, and covered by the opaque layer.

3. The portable communication device of claim 2, wherein a first ratio of the length of the chamfered portion to the height of the chamfered portion is different from a second ratio of a length of the other chamfered portion with respect to the side surface to a height of the other chamfered portion with respect to an unchamfered portion of the lower surface.

4. The portable communication device of claim 1, wherein a portion of the housing facing at least part of the chamfered portion and at least part of the side surface is substantially composed of a black color.

5. The portable communication device of claim 1, wherein a portion of the housing facing at least part of the chamfered portion is covered by another opaque layer.

6. The portable communication device of claim 5, wherein another portion of the housing is covered by a third opaque layer extended from the other opaque layer.

7. The portable communication device of claim 1, wherein the third opaque layer includes a curved surface.

8. The portable communication device of claim 1, wherein the opaque layer covers the side surface of the curved portion entirely.

9. The portable communication device of claim 1, wherein the housing is made of a metallic material.

10. The portable communication device of claim 1, wherein the glass panel is made of a transparent material.

11. The portable communication device of claim 1, wherein the display includes a foldable display.

12. A portable communication device comprising:
a display;
a housing comprising at least part of a side of the portable communication device;
a glass panel disposed on the display and including a planar portion and a curved portion extended from an edge of the planar portion, the curved portion including a upper portion, a lower portion facing opposite to the upper portion and a side portion, the upper portion including a first chamfered portion formed at an ending portion of the upper portion as adjacent to the side portion such that a length of the first chamfered portion with respect to the side portion is substantially greater than a height of the first chamfered portion with respect to an unchamfered portion of the upper portion; and a first opaque layer covering at least part of the lower portion of the curved portion and at least part of the side portion of the curved portion.

13. The portable communication device of claim 12, wherein the lower portion includes a second chamfered portion formed at an ending portion of the lower portion as adjacent to the side portion, and covered by the first opaque layer.

14. The portable communication device of claim 13, wherein a portion of the housing facing at least part of the second chamfered portion is covered by a second opaque layer.

15. The portable communication device of claim 14, wherein another portion of the housing is covered by a third opaque layer extended from the second opaque layer.

16. The portable communication device of claim 15, wherein the third opaque layer includes a curved surface.

17. The portable communication device of claim 13, wherein a first ratio of the length of the first chamfered portion to the height of the first chamfered portion is different from a second ratio of a length of the second chamfered portion with respect to the side portion to a height of the second chamfered portion with respect to an unchamfered portion of the lower portion.

18. The portable communication device of claim 12, wherein a portion of the housing facing at least part of the first chamfered portion and at least part of the side portion is substantially composed of a black color.

19. The portable communication device of claim 12, wherein the first opaque layer covers the side portion of the curved portion entirely.

20. The portable communication device of claim 12, wherein the glass panel is made of a transparent material.

* * * * *